(12) United States Patent
Matsushima et al.

(10) Patent No.: US 8,276,093 B2
(45) Date of Patent: Sep. 25, 2012

(54) COMPUTER-READABLE STORAGE MEDIUM HAVING OBJECT DISPLAY ORDER CHANGING PROGRAM STORED THEREIN AND APPARATUS

(75) Inventors: Yoshihiro Matsushima, Kyoto (JP);
Tomohiro Kawase, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 525 days.

(21) Appl. No.: 12/544,557

(22) Filed: Aug. 20, 2009

(65) Prior Publication Data

US 2010/0017732 A1   Jan. 21, 2010

Related U.S. Application Data

(63) Continuation-in-part of application No. 12/149,266, filed on Apr. 29, 2008.

(30) Foreign Application Priority Data

Apr. 24, 2008 (JP) ................................. 2008-114434
Aug. 21, 2008 (JP) ................................. 2008-213383

(51) Int. Cl.
*G06F 15/00* (2006.01)
*G06F 13/00* (2006.01)
(52) U.S. Cl. ........................................ 715/784; 715/787
(58) Field of Classification Search .................. 715/769, 715/838, 851, 763–765, 784–787, 803–806
See application file for complete search history.

(56) References Cited

U.S. PATENT DOCUMENTS

| 5,391,918 | A  |   | 2/1995  | Koyanagi et al. |
|-----------|----|---|---------|-----------------|
| 5,497,455 | A  |   | 3/1996  | Suga et al.     |
| 5,966,122 | A  |   | 10/1999 | Itoh            |
| 6,590,568 | B1 |   | 7/2003  | Astala et al.   |
| 7,437,005 | B2 | * | 10/2008 | Drucker et al. ............... 382/224 |
| 2003/0122787 | A1 |   | 7/2003  | Zimmerman et al. |
| 2004/0186371 | A1 |   | 9/2004  | Toda            |
| 2007/0186178 | A1 | * | 8/2007  | Schiller ........................ 715/769 |
| 2009/0119614 | A1 | * | 5/2009  | Tienvieri et al. .............. 715/786 |

FOREIGN PATENT DOCUMENTS

| JP | 6-12217      | 1/1994  |
| JP | 10-97407     | 4/1998  |
| JP | 11-177926    | 7/1999  |
| JP | 2004-283325  | 10/2004 |
| JP | 2005-169880  | 6/2005  |
| JP | 2005-227826  | 8/2005  |
| JP | 2008-97435   | 4/2008  |
| WO | 2007/067858  | 6/2007  |

* cited by examiner

*Primary Examiner* — Cao "Kevin" Nguyen
(74) *Attorney, Agent, or Firm* — Nixon & Vanderhye P.C.

(57) ABSTRACT

An icon line is displayed on a screen. A display order for the icon line can be changed by using a switch input unit enabling a direction input. When an input in a first direction is made, objects are scrolled so as to sequentially display each object at a specific position or the objects are scrolled across the specific position. When an input in the second direction is made, an object positioned at the specific position is saved at a saving position or an object positioned at the saving position is positioned at the specific position. Thus, a user is allowed to easily change the display order in which a plurality of objects are displayed on a screen.

10 Claims, 20 Drawing Sheets

F I G. 2
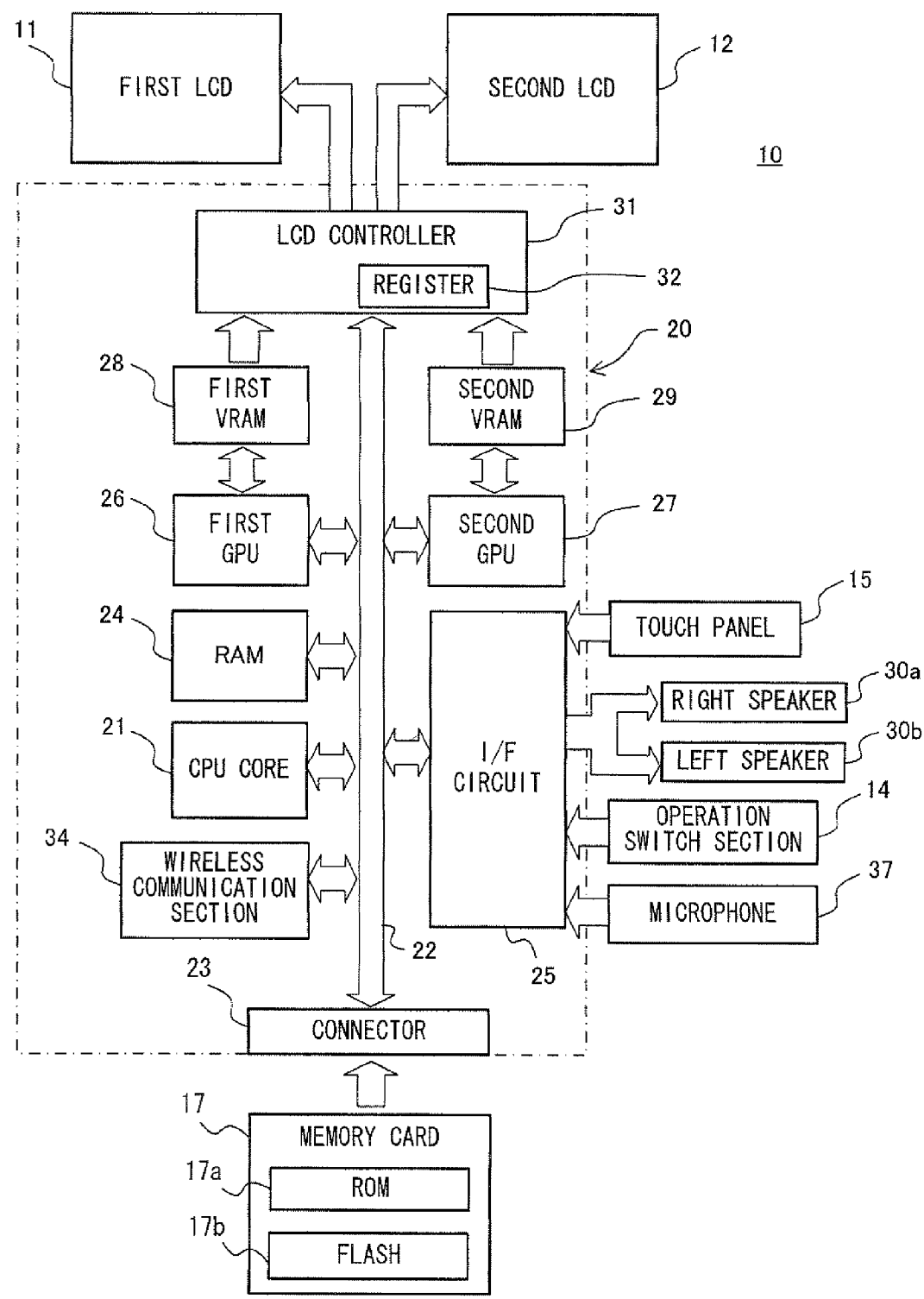

F I G. 2 3

| SHIFT PATTERN | OPERATION | |
| --- | --- | --- |
| | TOUCH OPERATION | KEY OPERATION |
| START MODE → DRAGGING MODE | DRAG ICON OF ICON LINE VERTICALLY | NON |
| START MODE → SAVING MODE | NON | PRESS UPPER BUTTON |
| DRAGGING MODE → START MODE | DROP DRAGGED ICON OUTSIDE SAVING AREA | NON |
| DRAGGING MODE → SAVING MODE | DROP DRAGGED ICON IN SAVING AREA | NON |
| SAVING MODE → START MODE | TAP ON SAVED ICON | PRESS LOWER BUTTON |
| SAVING MODE → DRAGGING MODE | DRAG SAVED ICON | NON |

COMPUTER-READABLE STORAGE MEDIUM HAVING OBJECT DISPLAY ORDER CHANGING PROGRAM STORED THEREIN AND APPARATUS

CROSS REFERENCE TO RELATED APPLICATION

This application is a Continuation-In-Part of U.S. patent application Ser. No. 12/149,266 filed 29 Apr. 2008; which claims priority to Japanese Patent Application No. 2008-114434 filed on 24 Apr. 2008; and Japanese Patent Application No. 2008-213383 filed 21 Aug. 2008 the entire contents of which are hereby incorporated by reference.

BACKGROUND OF THE INVENTION

1. Field of the Invention

The present invention relates to a computer-readable storage medium having an object display order changing program stored therein, and an apparatus therefor, and, more particularly, to a computer-readable storage medium having stored therein an object display order changing program which allows a user to optionally change, by using switch input means, a display order in which a plurality of objects are displayed on a screen, and an apparatus therefor.

2. Description of the Background Art

Conventionally, a device for displaying, to a user, a plurality of objects (thumbnail images, icons, or the like) on a screen is provided. In general, when multiple objects exist, such a device displays some of the objects on the screen, and displays the remaining other objects in accordance with a scrolling operation (for example, operating a scroll bar) performed by a user. Thus, even when multiple objects exist, visibility is not deteriorated.

Conventionally, provided is also a device which allows a user to optionally change a display order in which a plurality of objects as described above are displayed. For example, an image order determination device disclosed in Japanese Laid-Open Patent Publication No. 2005-227826 allows a user to change a display order in which a plurality of objects are displayed, in the following process steps.

In the first step, a user drags to and drops onto a provisional saving area (a predetermined area on a screen) a desired thumbnail image, among a plurality of thumbnail images (corresponding to the objects described above) displayed in a display area, by using a pointing device such as a mouse, so as to save the thumbnail image in the provisional saving area.

In the second step, the user operates a scroll box (corresponding to the scroll bar described above) as necessary so as to scroll the screen (thumbnail images) of the display area.

In the third step, the user drags to and drops onto the display area the thumbnail image which is saved in the provisional saving area.

As described above, the image order determination device disclosed in Japanese Laid-Open Patent Publication No. 2005-227826 allows a user to move a desired thumbnail image to a desired destination (between any two thumbnail images adjacent to each other), in the process steps described above.

However, when a desired thumbnail image is moved to a desired destination, the image order determination device disclosed in Japanese Laid-Open Patent Publication No. 2005-227826 needs to perform the first to the third steps as described above, thereby causing a problem that the operation is bothersome.

Further, it is necessary to operate an elongated scroll box in order to scroll the display area, thereby causing a problem that high precision operation is necessary for indicating a position on the scroll box by using a pointing device.

SUMMARY OF THE INVENTION

Therefore, an object of the present invention is to provide a computer-readable storage medium having stored therein an object display order changing program for allowing a user to easily change a display order in which a plurality of objects are displayed on a screen, and an apparatus therefor.

The present invention has the following features to attain the object mentioned above. Reference numerals, figure numbers, and supplementary descriptions in the parentheses indicate an exemplary correspondence with the drawings so as to aid in understanding the present invention, and are not intended to limit, in any way, the scope of the present invention.

A computer-readable storage medium according to the present invention is a computer-readable storage medium having stored therein an object display order changing program for enabling a user to change, by using switch input means enabling a direction input, a display order (FIG. 4) in which a plurality of objects (icons 40a to 40x) are displayed on a screen (12).

The object display order changing program causes a computer to execute the following steps.

an object display step of displaying a subset (m; m>1) of objects, among the plurality of objects, in an object display area on the screen in a predetermined display order so as to align the subset of objects along a first direction a first scrolling step of scrolling, in the first direction, the plurality of objects so as to sequentially display each object at a specific position in the object display area, in accordance with an input in the first direction being made by using the switch input means a saving step of saving, in a predetermined saving area, an object displayed at the specific position, among the subset of objects displayed in the object display area, when an input in a second direction different from the first direction is made by using the switch input means a second scrolling step of scrolling, when an input in the first direction is made by using the switch input means while an object is saved in the predetermined saving area, all the plurality of objects other than the object saved in the predetermined saving area, across the specific position, in the first direction an object insertion step of inserting, when an input, in the second direction, which is reverse to the input made for the saving step, is made by using the switch input means while an object is saved in the predetermined saving area, the object saved in the predetermined saving area between two objects which are displayed adjacent to each other in the object display area so as to sandwich the specific position.

The "display order" described above means a visually recognizable order in which the plurality of objects are aligned on the screen.

The switch input means may be a cross key.

The object display order changing program may cause the computer to further execute the following step.

starting step of starting a program corresponding to an object displayed at the specific position, among the subset of objects displayed in the object display area, in accordance with a predetermined button operation being performed The starting step may start the program corresponding to the object displayed at the specific position, among the subset of objects displayed in the object display area, in accordance with the predetermined button operation being performed, only when no object is saved in the predetermined saving area.

The object display order changing program may cause the computer to further execute the following step.

information display step of displaying information of the program corresponding to the object displayed at the specific position The object display order changing program may cause the computer to further execute the following step.

control step of performing control so as to prevent the input in the second direction made for the saving step by using the switch input means from being accepted while an object is saved in the predetermined saving area The object display order changing program may cause the computer to further execute the following step.

associated process execution step of performing, in accordance with the predetermined button operation being performed, a process associated with the object displayed at the specific position, and performing control so as to prevent the predetermined button operation from being accepted while an object is saved in the predetermined saving area The associated process execution step is, for example, the starting step but may be any step other than the starting step The object display step displays the subset of objects in the predetermined display order so as to align the subset of objects along a predetermined direction, and the first direction may be the predetermined direction.

The first direction and the second direction may be orthogonal to each other. Thus, a user is able to easily select a desired process method.

Two or more objects may be simultaneously saved in the predetermined saving area. Thus, it is possible to efficiently change the display order in which two or more objects are displayed.

An object display order changing apparatus according to the present invention is an apparatus for enabling a user to change, by using switch input means enabling a direction input, a display order (FIG. 4) in which a plurality of objects (icons 40a to 40x) are displayed on a screen (12).

The object display order changing apparatus comprises the following means.

display means having the screen
the switch input means
object display means for displaying a subset (m; m>1) of objects, among the plurality of objects, in an object display area on the screen in a predetermined display order so as to align the subset of objects along a first direction
first scrolling means for scrolling, in the first direction, the plurality of objects so as to sequentially display each object at a specific position in the object display area, in accordance with an input in the first direction being made by using the switch input means
saving means for saving, in a predetermined saving area, an object displayed at the specific position, among the subset of objects displayed in the object display area, when an input in a second direction different from the first direction is made by using the switch input means
second scrolling means for scrolling, when an input in the first direction is made by using the switch input means while an object is saved in the predetermined saving area, all the plurality of objects other than the object saved in the predetermined saving area, across the specific position, in the first direction
object insertion means for inserting, when an input, in the second direction, which is reverse to the input made for the saving means, is made by using the switch input means while an object is saved in the predetermined saving area, the object saved in the predetermined saving area between two objects which are displayed adjacent to each other in the object display area so as to sandwich the specific position.

According to the present invention, a user is allowed to easily change the display order in which a plurality of objects are displayed on the screen.

These and other objects, features, aspects and advantages of the present invention will become more apparent from the following detailed description when taken in conjunction with the accompanying drawings.

BRIEF DESCRIPTION OF THE DRAWINGS

FIG. 2 is a diagram illustrating an internal structure of the game apparatus 10;

FIG. 23 is a diagram illustrating a condition of an operation under which a mode is changed;

DESCRIPTION OF THE PREFERRED EMBODIMENTS

Hereinafter, an embodiment of the present invention will be described.

Figure 1:
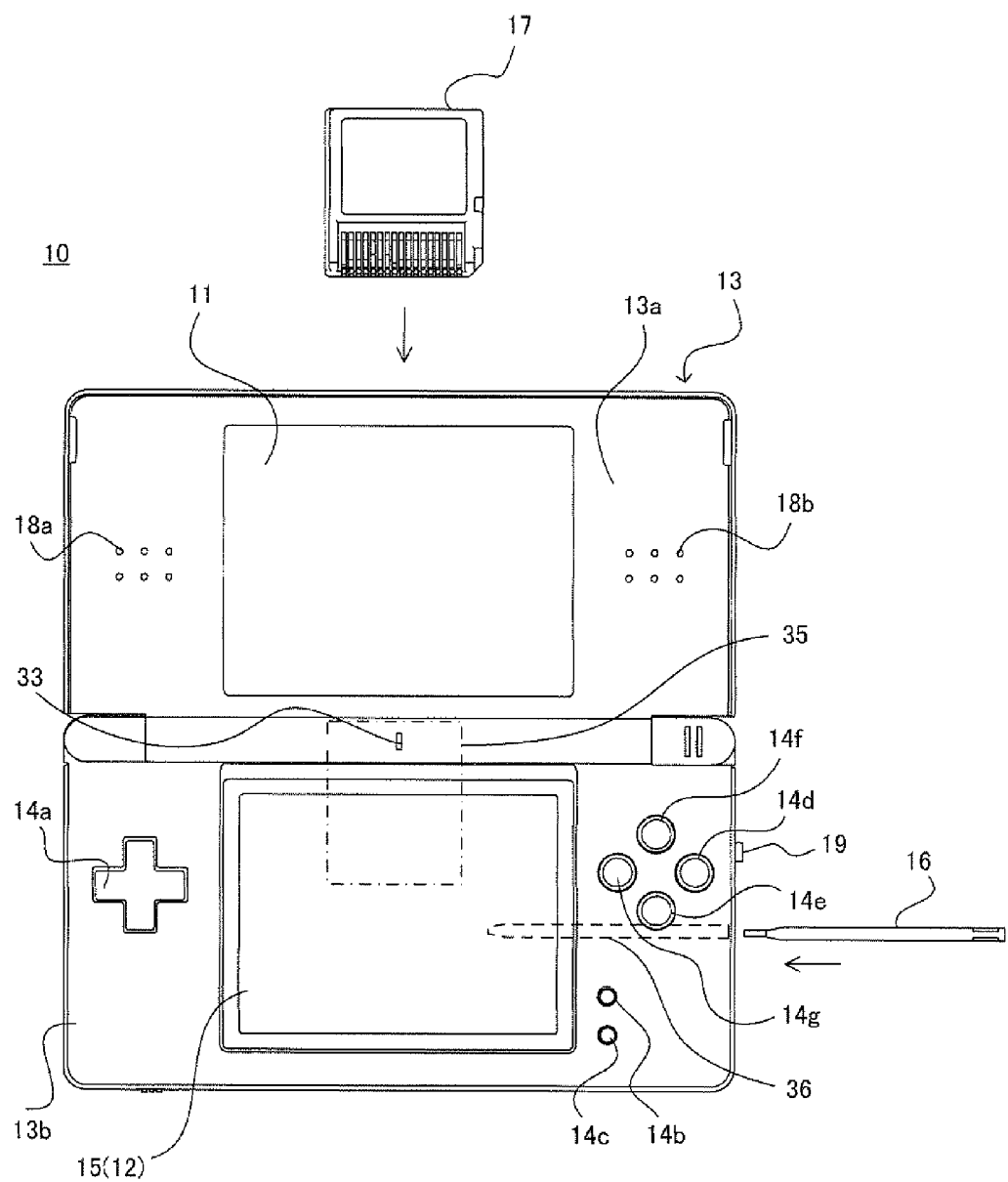
FIG. 1 is a diagram illustrating an outer appearance of a game apparatus 10 according to an embodiment of the present invention.

FIG. 1 is a diagram illustrating an outer appearance of a game apparatus according to an embodiment of the present invention. The present invention can be applied to a stationary game apparatus as well as a hand-held game apparatus. Further, the present invention can be applied to any information processing apparatus (for example, personal computer, mobile telephone, television receiver, DVD player, and the like) having a video contents display function, as well as a game apparatus.

In FIG. 1, a game apparatus 10 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. A resolution for each of the first LCD 11 and the second LCD 12 is 256 dots×192 dots. In the present embodiment, an LCD is used as a display device, but another display device such as, for example, a display device using an EL (Electro Luminescence) can be employed. Also, any resolution can be employed.

In the upper housing 13a, provided are sound holes 18a and 18b for outputting a sound to the outside from a pair of loudspeakers (30a and 30b in FIG. 2) described later. Further, a microphone hole 33 is provided in a hinge portion which connects between the upper housing 13a and the lower housing 13b so as to be openable and closable.

In the lower housing 13b, provided as input devices are a cross switch 14a, a start switch 14b, a select switch 14c, an A button 14d, a B button 14e, an X button 14f, and a Y button 14g. Further, on the side surface of the lower housing 13b, an L button and an R button not shown are provided. Also, as a further input device, a touch panel 15 is provided on a screen of the second LCD 12. On the side surfaces of the lower housing 13b, provided are a power switch 19, an insertion slot 35 (indicated by dashed-dotted line in FIG. 1) for connection of a memory card 17, and an insertion slot 36 (indicated by dotted line in FIG. 1) for accommodating a stick 16. Four separate buttons corresponding to an upward direction indication button, a downward direction indication button, a left direction indication button, and a right direction indication button, respectively, may be used instead of the cross switch 14a.

As for the touch panel 15, any type such as, for example, a resistive film type, an optical type (infrared type), or a capacitive coupling type can be employed. The touch panel 15 can be operated by a finger instead of the stick 16. In the present embodiment, the touch panel 15 having, similar to the resolution of the second LCD 12, a resolution (detection accuracy) of 256 dots×192 dots is employed. However, the resolution for the touch panel 15 and that for the second LCD 12 do not always need to be matched.

The memory card 17 includes a ROM 17a for storing a game program, and a RAM 17b for storing backup data in a rewritable manner, and is detachably inserted to the insertion slot 35 provided on the lower housing 13b. A first connector 23a (shown in FIG. 2) which connects with a connector provided on the memory card 17 at the edge thereof facing the insertion direction is provided in the inner portion of the insertion slot 35, which is not shown in FIG. 1. When the memory card 17 is inserted into the insertion slot 35, the connectors are connected with each other, thereby allowing the CPU core 21 (shown in FIG. 2) of the game apparatus 10 to access the memory card 17.

Next, referring to FIG. 2, an internal structure of the game apparatus 10 will be described. FIG. 2 is a block diagram illustrating an internal structure of the game apparatus 10. In FIG. 2, the CPU core 21 is mounted on an electronic circuit board 20 accommodated in the housing 13. Via a bus 22, the CPU core 21 is connected to a connector 23, an input/output interface circuit (denoted as an I/F circuit in the drawings) 25, a first GPU (Graphics Processing Unit) 26, a second GPU 27, the RAM 24, an LCD controller 31, and a wireless communication section 34. The memory card 17 is detachably connected to the connector 23. The I/F circuit 25 is connected to the touch panel 15, a right speaker 30a, a left speaker 30b, an operation switch section 14 including the cross switch 14a, the A button 14d and the like, which are shown in FIG. 1, and a microphone 37. The right speaker 30a and the left speaker 30b are provided inside the sound holes 18a and 18b, respectively. The microphone 37 is provided inside the microphone hole 33.

The first GPU 26 is connected to a first VRAM (Video PAM) 28, and the second GPU 27 is connected to a second VRAM 29. In accordance with an instruction from the CPU core 21, the first GPU 26 generates a first display image, and renders the first display image into the first VRAM 28. Similarly, in accordance with an instruction from the CPU core 21, the second GPU 27 generates a second display image, and renders the second display image in the second VRAM 29. The first VRAM 28 and the second VRAM 29 are connected to the LCD controller 31.

The LCD controller 31 includes a register 32. The register 32 stores a value "0" or "1" in accordance with an instruction from the CPU core 21. If the value in the register 32 is 0, the LCD controller 31 outputs, to the first LCD 11, the first display image rendered in the first VRAM 28, and outputs, to the second LCD 12, the second display image rendered in the second VRAM 29. On the other hand, if the value in the register 32 is 1, the first display image rendered in the first VRAM 28 is outputted to the second LCD 12, and the second display image rendered in the second VRAM 29 is outputted to the first LCD 11.

A wireless communication section 34 has a function of performing data transmission to and data reception from a wireless communication section of another game apparatus. Further, the game apparatus 10 can be connected to a wide area network such as the Internet through the wireless communication section 34, and can also communicate with another game apparatus through the network.

In the present embodiment, the CPU core 21 of the game apparatus 10 executes an object display order changing program loaded from the ROM 17a of the memory card 17 or the like to the RAM 24. The object display order chancing program allows a user to optionally change a display order in which a plurality of objects are displayed on a screen, by using coordinate input means. Hereinafter, an outline of an operation performed by the game apparatus 10 based on the object display order changing program will be described with reference to FIGS. 3 to 20.

Figure 3:
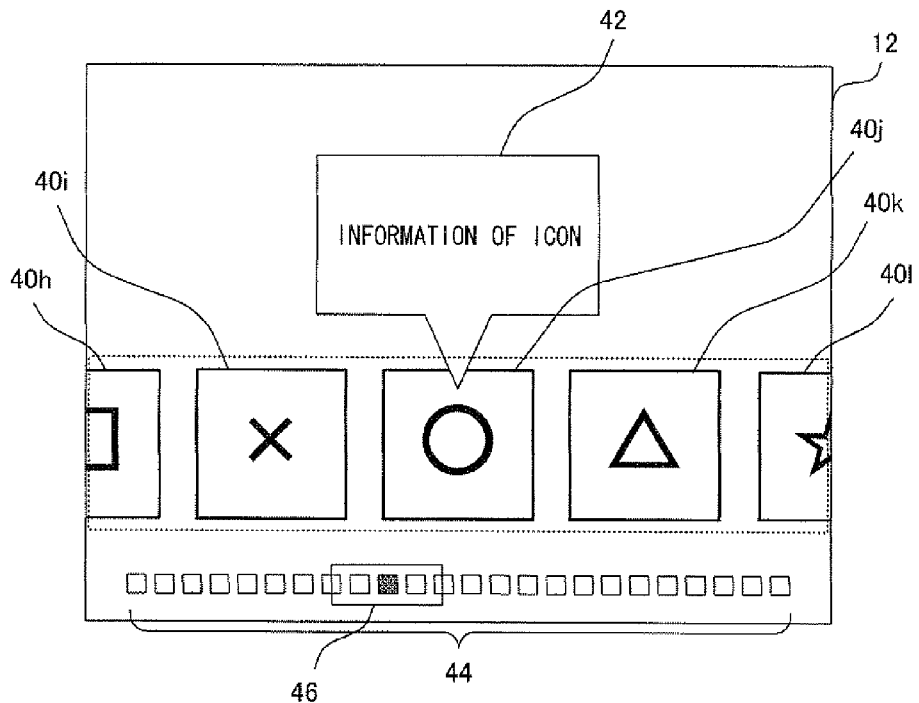
FIG. 3 is a diagram illustrating an image displayed on a screen of a second LCD 12.

FIG. 3 shows an image displayed on a screen of the second LCD 12 when the object display order changing program is executed. In FIG. 3, five icons (icons 40h, 40i, 40j, 40k, and 40l), a balloon 42, a slide bar 44, and a cursor 46 are displayed on the screen.

Figure 4:
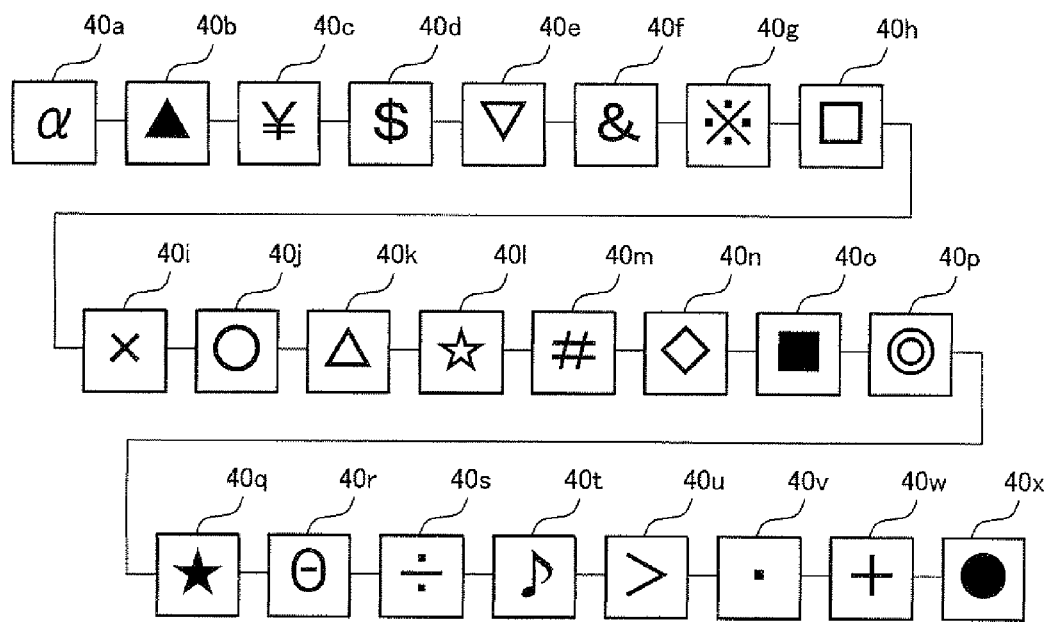
FIG. 4 is a diagram illustrating a display order of an icon 40.
Figure 16:
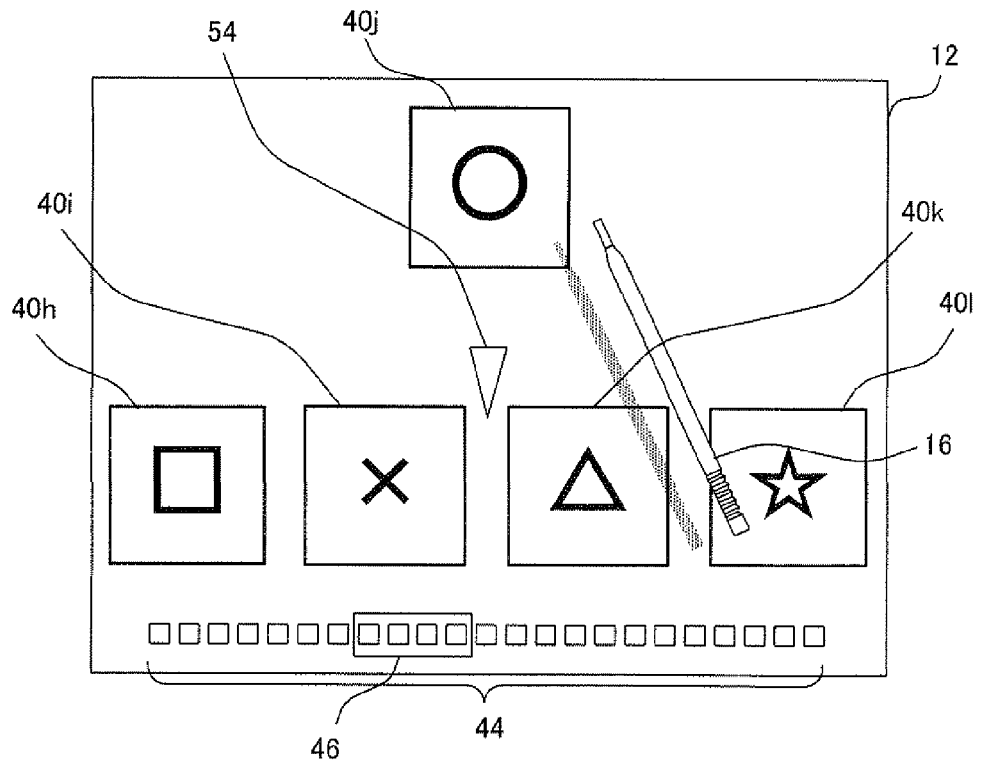
FIG. 16 is a diagram illustrating an image displayed on the screen of the second LCD 12.

The icon 40 represents an image associated with a program (computer program executable by the CPU core 21). A user is allowed to boot a desired program by using the icon 40. In the present embodiment, 24 icons (icons 40a to 40x) in total are aligned in the order as shown in FIG. 4, and some of the 24 icons are displayed on a predetermined area (herein after, referred to as an icon line display area) of the screen in accordance with the order. In the present embodiment, an area enclosed by dotted lines in FIG. 3 represents the icon line display area. A user selects an icon corresponding to a desired program from the icon line displayed on the icon line display area so as to cause the CPU core 21 to execute the desired program. The user is allowed to display and select any icon on the screen by scrolling the icon line displayed on the icon line display area. As described below, the icon line can be scrolled by using the cross key or through touch operation, and, through this scrolling, the icons of the icon line are sequentially displayed at the center position of the icon line display area. For example, when the icon line is scrolled leftward by a distance corresponding to one icon in a state where an icon 40c is displayed at the center position, the display position of the icon 40c is moved leftward from the center position, and an icon 40d is displayed at the center position. When in this state the icon line is further scrolled leftward by a distance corresponding to one icon, the display position of the icon 40d is moved leftward from the center position, and an icon 40e is displayed at the center position. However, in a saving mode (a state in which an object is saved in a saving area) described below, no icon is displayed at the center position of the icon line display area as shown in FIG. 16. For example, when the icon 40c is saved in the saving area, an icon 40b and the icon 40d are displayed so as to sandwich the center position. When in this state the icon line is scrolled leftward by a distance corresponding to one icon, the icon 40d and an icon 40e are displayed so as to sandwich the center position. When in this state the icon line is further scrolled leftward by a distance corresponding to one icon, the icon 40e and an icon 40f are displayed so as to sandwich the center position.

The balloon 42 represents an image for providing a user with information (information about the program corresponding to the icon, and the like) relating to the icon (icon 40j in an example shown in FIG. 3) displayed at the center position of the icon line display area.

The slide bar 44 provides a user with various functions in combination with the cursor 46. 24 squares displayed on the slide bar 44 correspond to 24 icons 40a to 40x, respectively. The cursor 46 indicates the icons, among the icons 40a to 40x, currently displayed on the icon line display area. A user is allowed to drag the cursor 46 along the slide bar 44 (that is, in the lateral direction) by using the stick 16, so as to move the cursor 46 to any point on the slide bar 44. Further, a user is also allowed to touch any point on the slide bar 44 so as to move the cursor 46 to the point. The icons displayed on the icon line display area are changed in accordance with a position of the cursor 46 being changed on the slide bar 44. Thus, by using the slide bar 44 and the cursor 46, a user is allowed to display a desired icon, among the icons 40a to 40x, on the icon line display area. In the present embodiment, as an operation method for displaying a desired icon on the icon line display area, used are various operation methods other than the method in which the slide bar 44 and the cursor 46 are used.

An operation method in which a user changes the order in which the icons 40a to 40x are aligned will be specifically described with reference to FIGS. 5 to 20.

Figure 5:
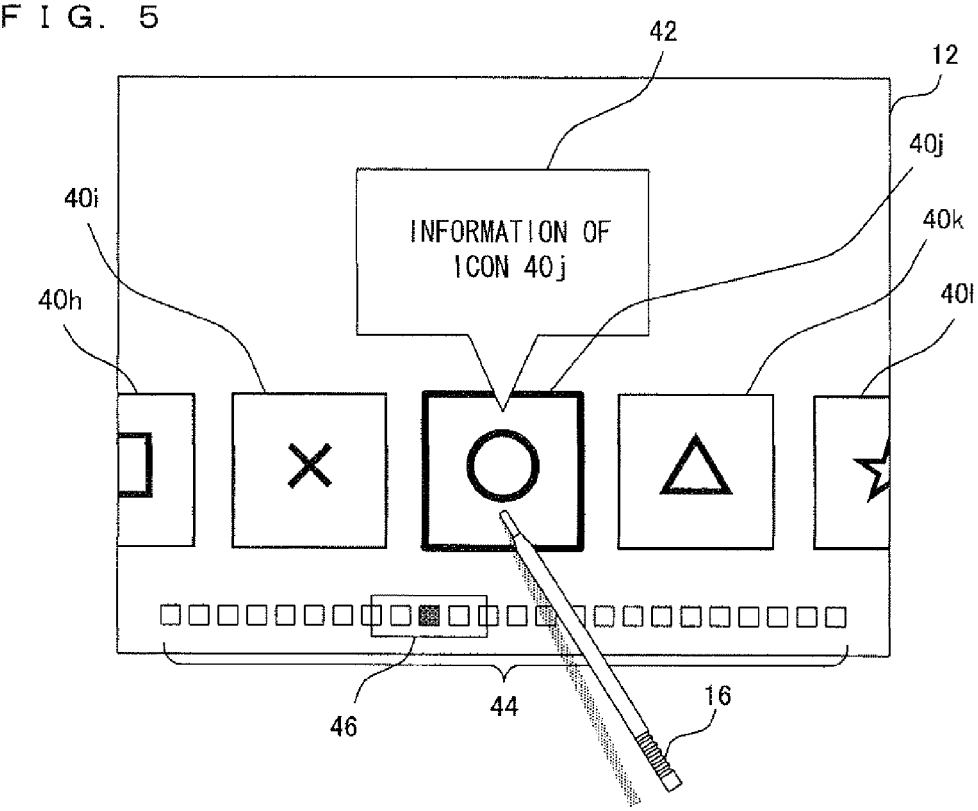
FIG. 5 is a diagram illustrating an image displayed on the screen of the second LCD 12.

FIG. 5 shows an exemplary screen displayed when a user touches the icon 40j by using the stick 16. When a user touches the icon 40j by using the stick 16, the touched icon 40j is highlighted (for example, a contour thereof is highlighted).

Figure 6:
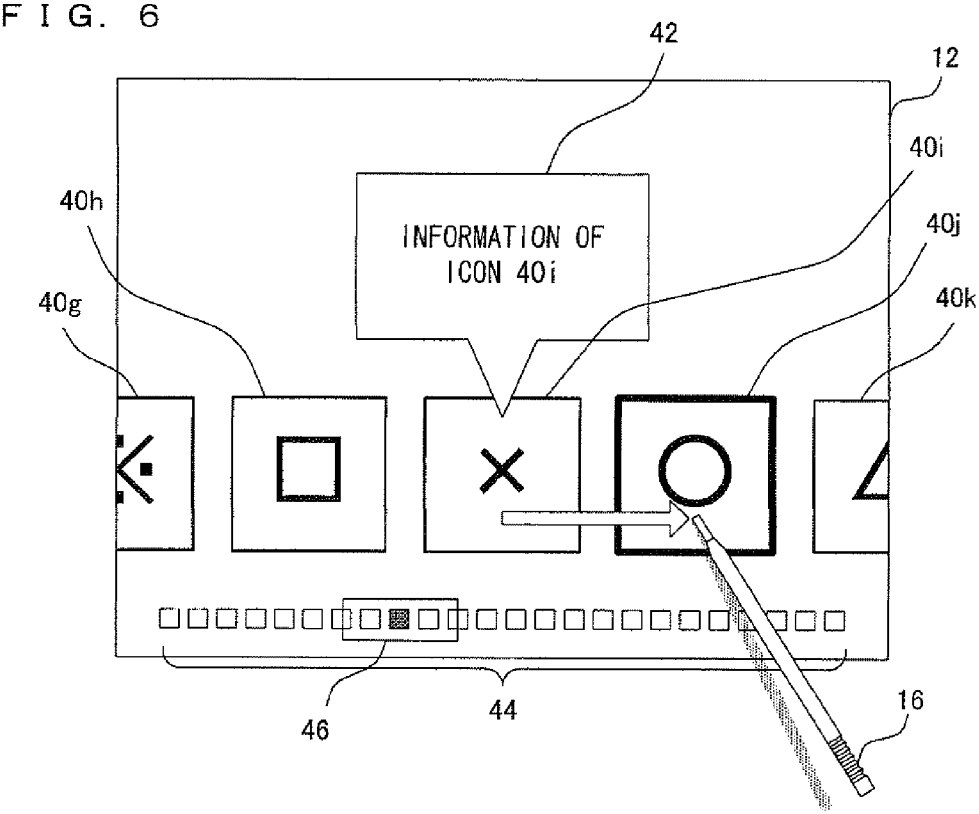
FIG. 6 is a diagram illustrating an image displayed on the screen of the second LCD 12.

When in the state (that is, a state where one of the icons on the icon line is touched by the stick 16) shown in FIG. 5 a user slides the stick 16 rightward on the screen (the stick 16 touching the screen is slid), the icon line displayed on the icon line display area is scrolled rightward in accordance with a sliding distance over which the stick 16 slides, as shown in FIG. 6. When a user slides the stick 16 leftward, the icon line displayed on the icon line display area is scrolled leftward in accordance with a sliding distance over which the stick 16 slides. Thus, while an icon displayed on the icon line display area is being touched by the stick 16, the stick 16 is laterally slid, thereby allowing a user to scroll the icon line. At this time, a position of the cursor 46 is moved in accordance with the icon line being scrolled.

Figure 7:
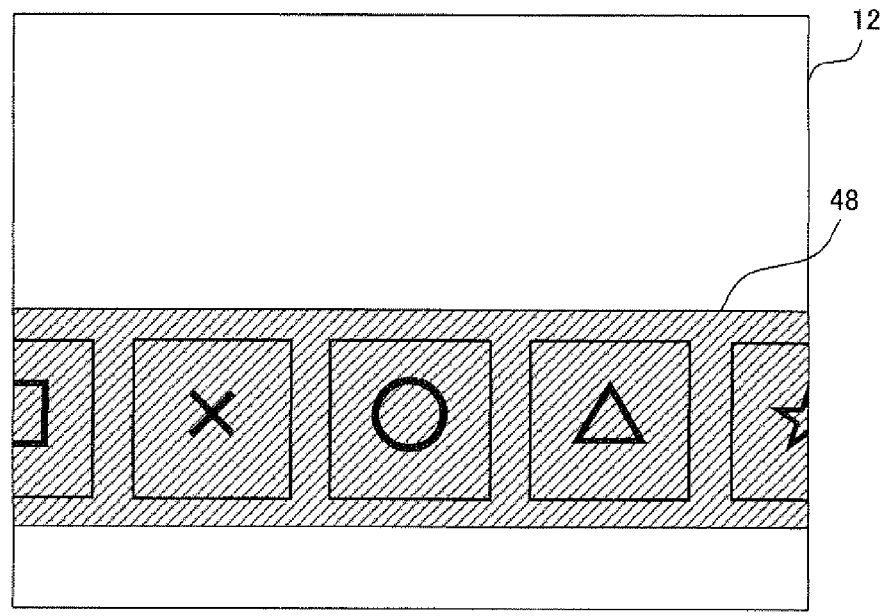
FIG. 7 is a diagram illustrating a scroll area 48.

In the present embodiment, as shown in FIG. 7, a scroll area 48 including the icon line is defined. When a user touches any point on the scroll area 48 as well as on an icon, and laterally slides a touch position, the icon line can be scrolled. For example, also while the stick 16 is touching a clearance between the icon 40h and the icon 40i shown in FIG. 5, the stick 16 is laterally slid, thereby enabling the icon line to be scrolled.

Figure 8:
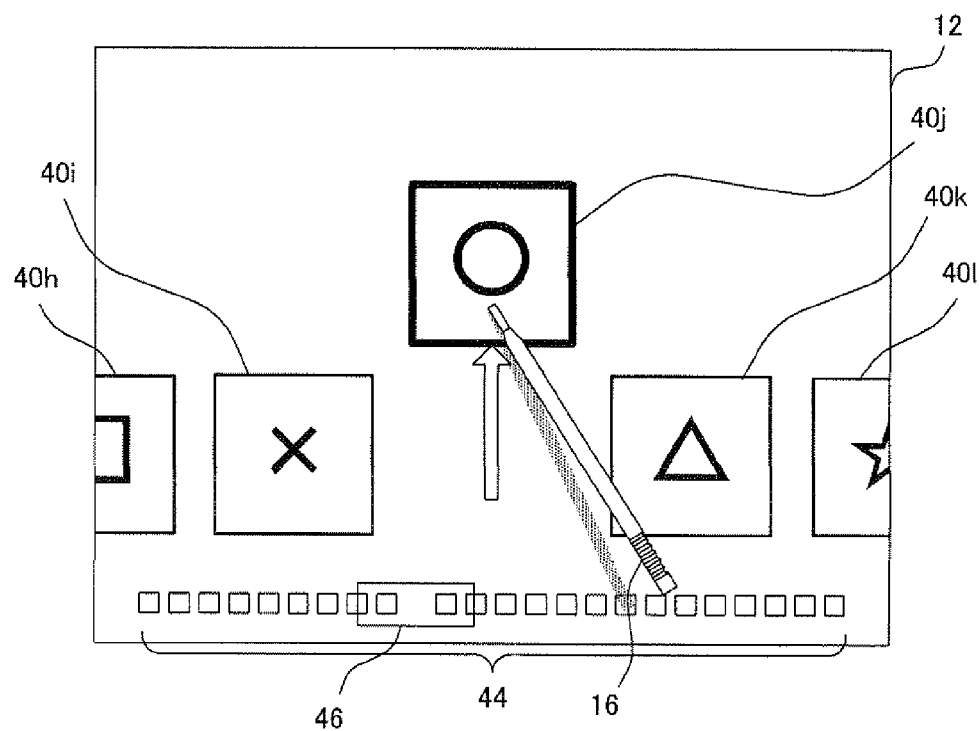
FIG. 8 is a diagram illustrating an image displayed on the screen of the second LCD 12.
Figure 9:
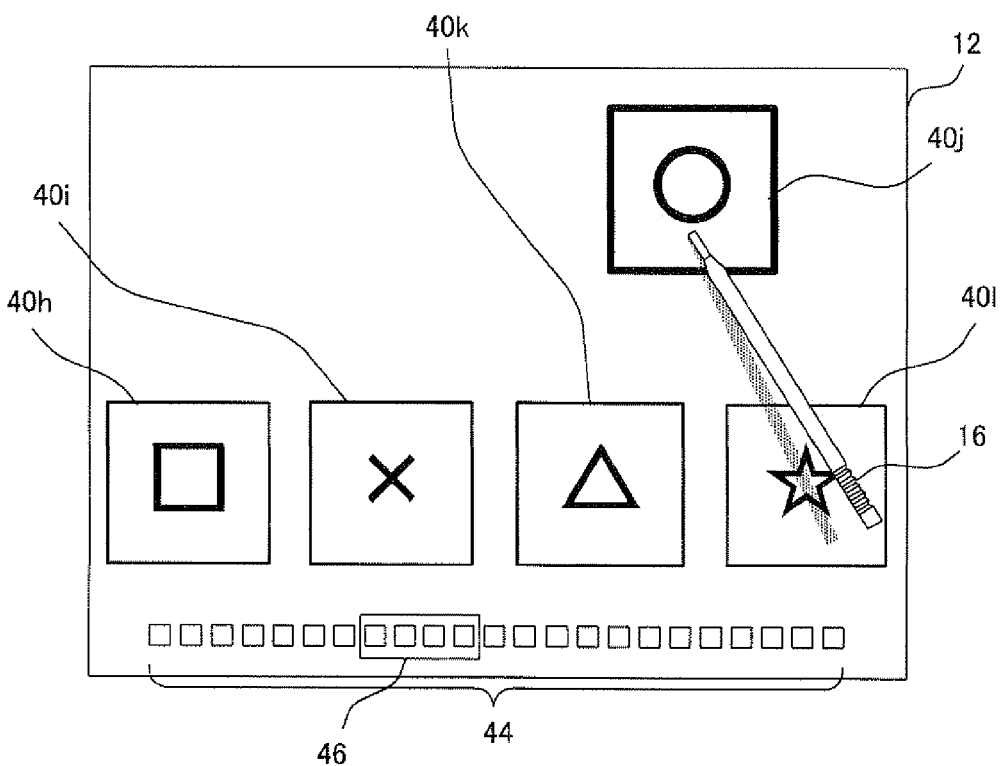
FIG. 9 is a diagram illustrating an image displayed on the screen of the second LCD 12.

When in the state (that is, a state where one of the icons on the icon line is touched by the stick 16) shown in FIG. 5 a user slides the stick 16 upward on the screen, the icon 40j moves upward so as to follow the stick 16 as shown in FIG. 8. When a user slides the stick 16 downward, the icon 40j moves downward so as to follow the stick 16. Thus, while the stick 16 is touching an icon displayed on the icon line display area, the stick 16 is vertically slid, thereby allowing a user to extract a desired icon from the icon line. Thus, while the stick 16 is touching the screen (touch panel), a user is allowed to optionally move (drag) the icon 40j extracted from the icon line, by sliding the stick 16 in a desired direction, as shown in FIG. 9. In the following description, an icon being dragged by a user is referred to as a "dragged icon" as necessary. When the icon 40j is extracted from the icon line, the number of squares of the slide bar 44 is accordingly updated to 23, and display positions at which the icons 40h, 40i, 40k, and 40l are displayed are also updated (see FIG. 9).

In an exemplary modification, only when a user slides the stick 16 upward (not downward), a desired icon may be extracted from the icon line.

Figure 10:
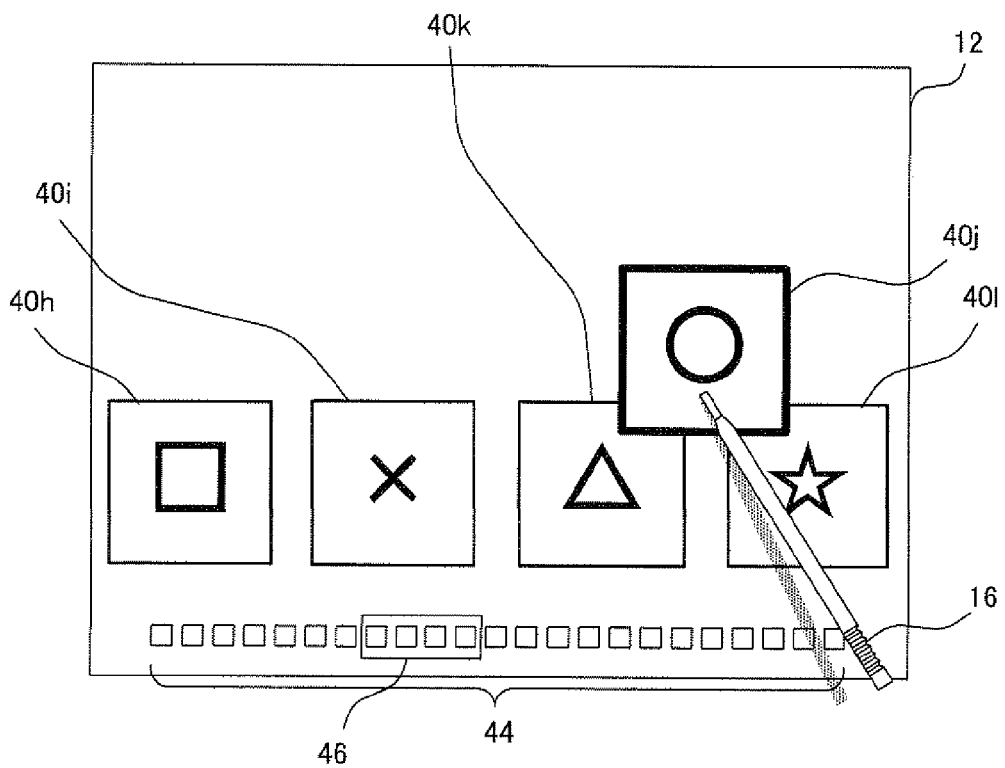
FIG. 10 is a diagram illustrating an image displayed on the screen of the second LCD 12.
Figure 11:
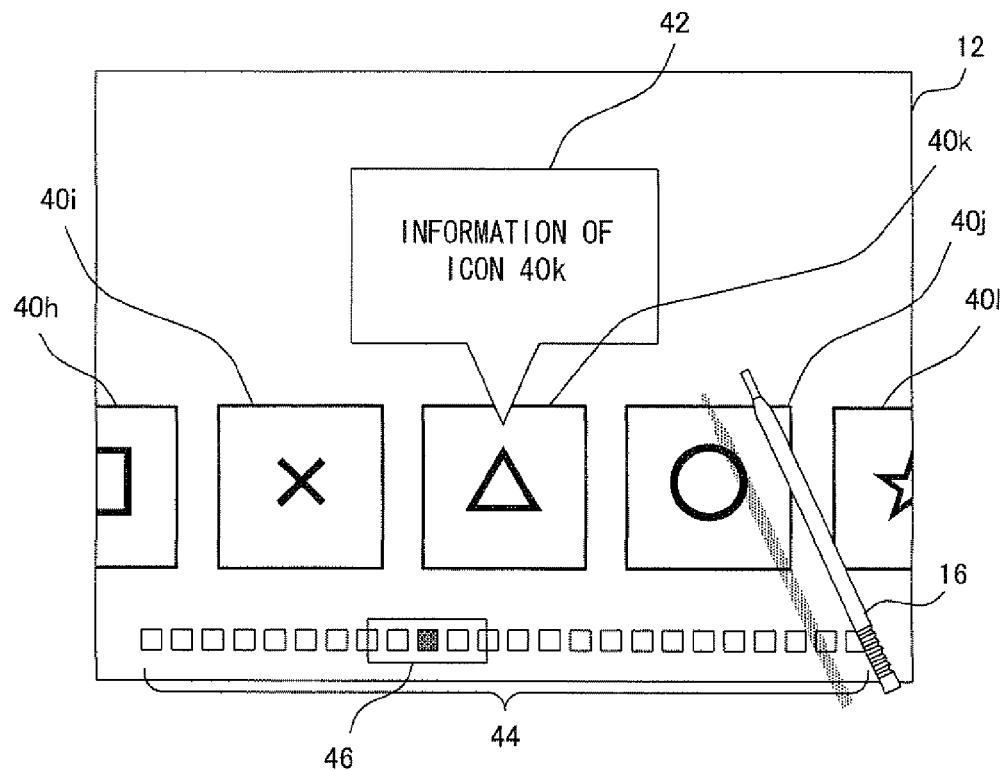
FIG. 11 is a diagram illustrating an image displayed on the screen of the second LCD 12.

When in the state (that is, a state where an icon is being dragged by using the stick 16) shown in FIG. 9 a user drags the icon 40j to a position (that is, a position between the icon 40k and the icon 40l) as shown in FIG. 10 and drops (moves the stick 16 away from the screen) the icon 40j thereon, the icon 40j is inserted between the icon 40k and the icon 40l as shown in FIG. 11, so that the number of squares of the slide bar 44 is updated to 24, and the highlighting for the icon 40j is canceled.

Figure 12:
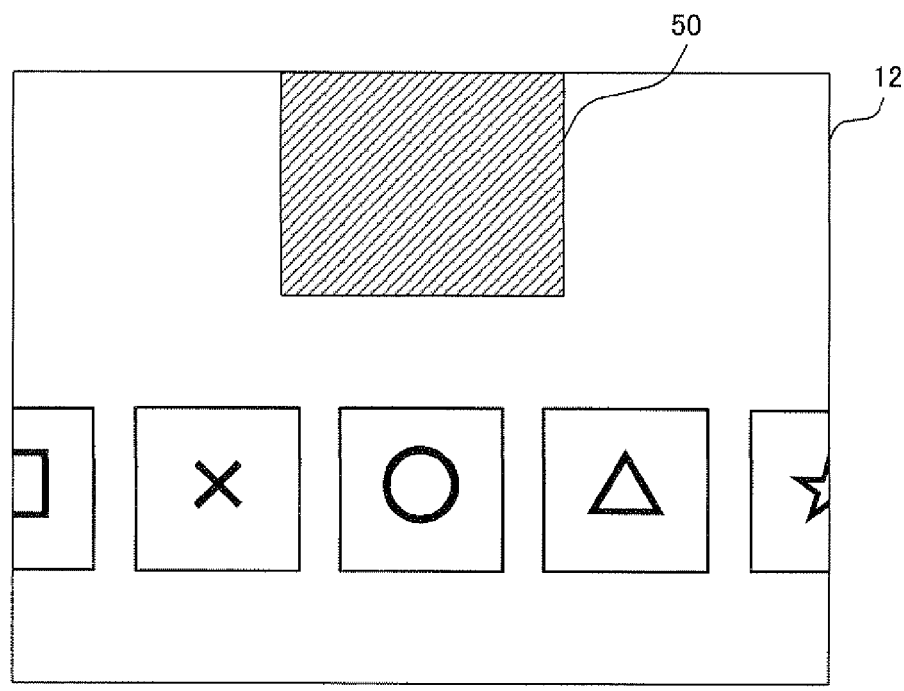
FIG. 12 is a diagram illustrating a saving area 50.

In the present embodiment, as shown in FIG. 12, a saving area 50 is defined at a position distanced from the icon line display area. A user is allowed to insert a dragged icon in the icon line by dropping the dragged icon at any point outside the saving area 50 as well as at a position between two icons, adjacent to each other, included in the icon line. The dragged icon is typically inserted between two icons, adjacent to each other, which are included in the icon line and are closest to a point at which the dragged icon is dropped. For example, when the icon 40j is dropped in the state shown in FIG. 9, the icon 40j may be inserted between the icon 40k and the icon 40l. A case where the dragged icon is dropped in the saving area 50 will be described later.

Figure 13:
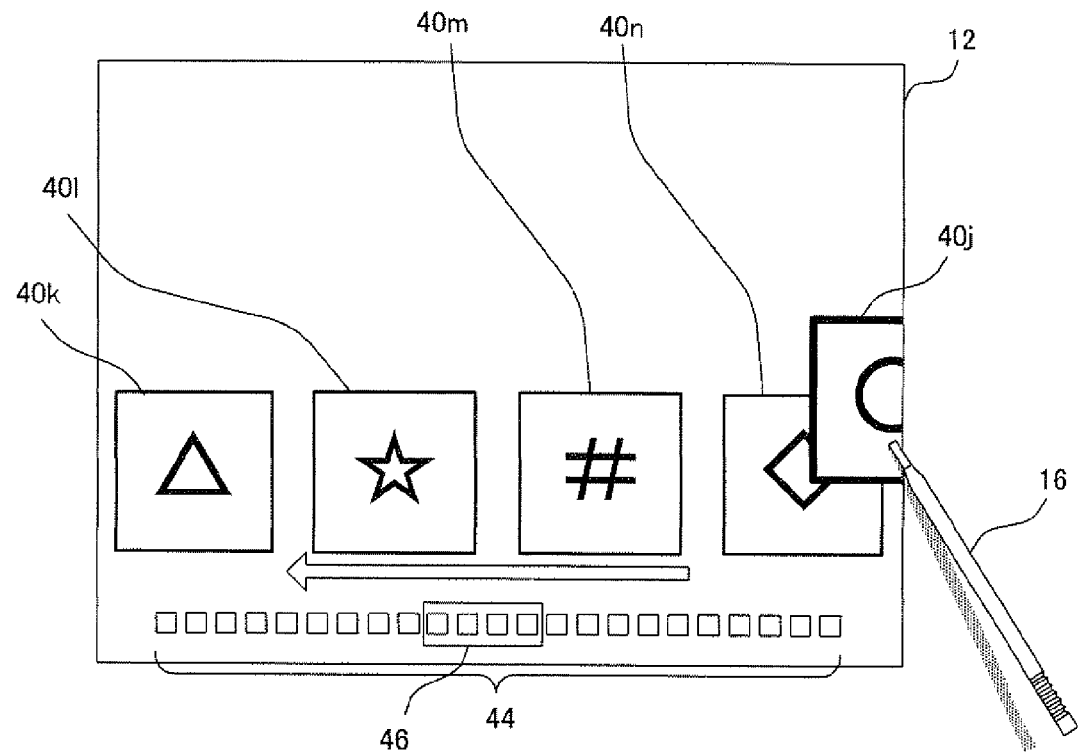
FIG. 13 is a diagram illustrating an image displayed on the screen of the second LCD 12.
Figure 14:
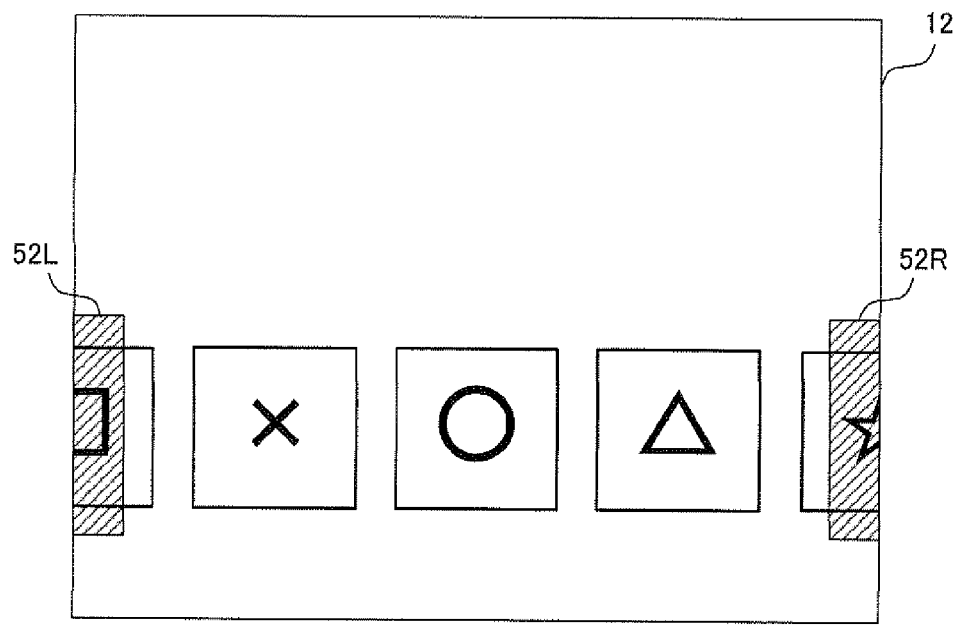
FIG. 14 is a diagram illustrating a right edge area 52R and a left edge area 52L.

When in the state (that is, a state where an icon is being dragged by using the stick 16) shown in FIG. 9 a user drags the icon 40j to the right edge of the icon line display area as shown in FIG. 13, the icon line starts to be scrolled in the direction (that is, the left direction on the screen) indicated by an arrow in the figure. In the present embodiment, as shown in FIG. 14, a right edge area 52R is defined near the right edge of the icon line display area, and a left edge area 52L is defined near the left edge of the icon line display area. A user is allowed to scroll the icon line leftward by positioning the dragged icon (the icon 40j in an example shown in FIG. 13) in the right edge area 52R. Similarly, a user is allowed to scroll the icon line rightward by positioning the dragged icon in the left edge area 52L. The scroll-display of the icon line is continued while the dragged icon is positioned in the right edge area 52R or the left edge area 52L, and ends at a time when the dragged icon leaves the areas. Therefore, as shown in FIG. 13, a user is allowed to insert the dragged icon in the icon line at a desired position by scrolling the icon line so as to display a desired destination (a clearance between any two icons, adjacent to each other, included in the icon line), and thereafter dragging to and dropping onto the desired destination the dragged icon. Through these operations, a user need not move the stick 16 away from the screen at all after a user touches a desired icon by using the stick 16 until the user inserts the icon in the icon line at a desired position, so that the display order in which the icons are displayed can be easily changed by performing once the sliding operation (that is, a series of operation from an operation of a user touching the screen by using the stick 16 so as to slide the screen to an operation of the user moving the stick 16 away from the screen).

Figure 15:
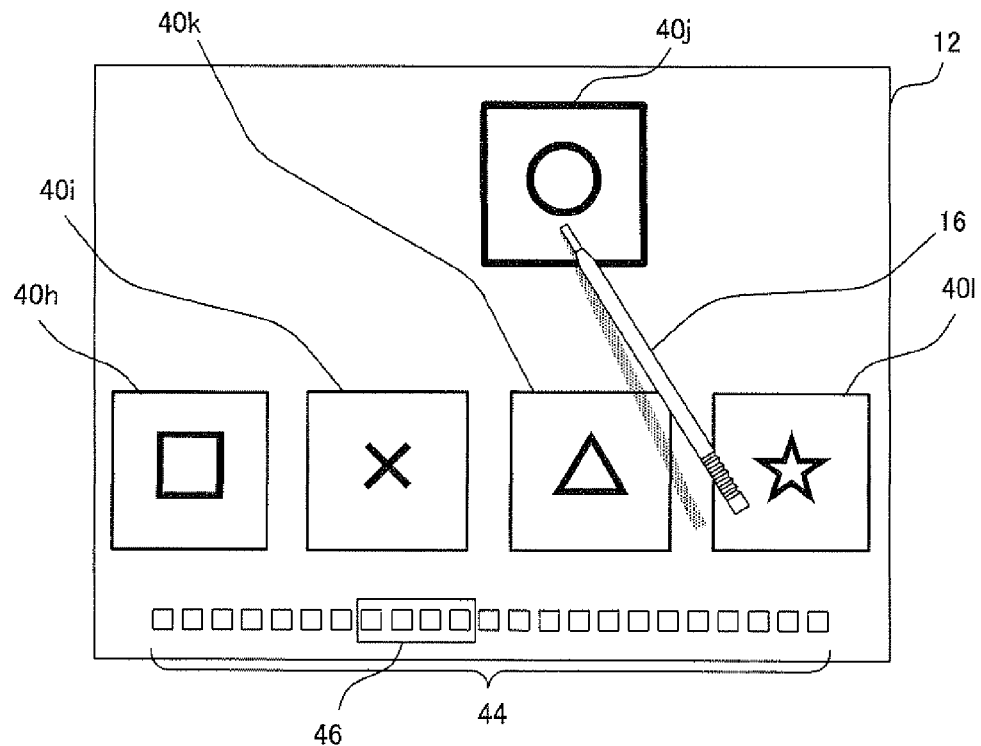
FIG. 15 is a diagram illustrating an image displayed on the screen of the second LCD 12.

When in the state (that is, a state where the icon is being dragged by using the stick 16) shown in FIG. 9 a user drags to and drops onto the saving area 50 (see FIG. 12) the icon 40j as shown in FIG. 15, the icon 40j is not inserted in the icon line but saved in the saving area 50 as shown in FIG. 16, and the highlighting for the icon 40j is canceled. In the following description, an icon saved in the saving area 50 is referred to as a "saved icon" as necessary. While the saved icon exists, a mark 54 is displayed on the screen as shown in FIG. 16. The mark 54 indicates a clearance between two icons, adjacent to each other, which are positioned near the center of the icon line displayed on the icon line display area, and when a user taps the stick 16 on the saved icon (that is, the stick 16 touching the saved icon is moved away from the screen without sliding the stick 16 on the screen), the saved icon is inserted in the clearance indicated by the mark 54.

Figure 17:
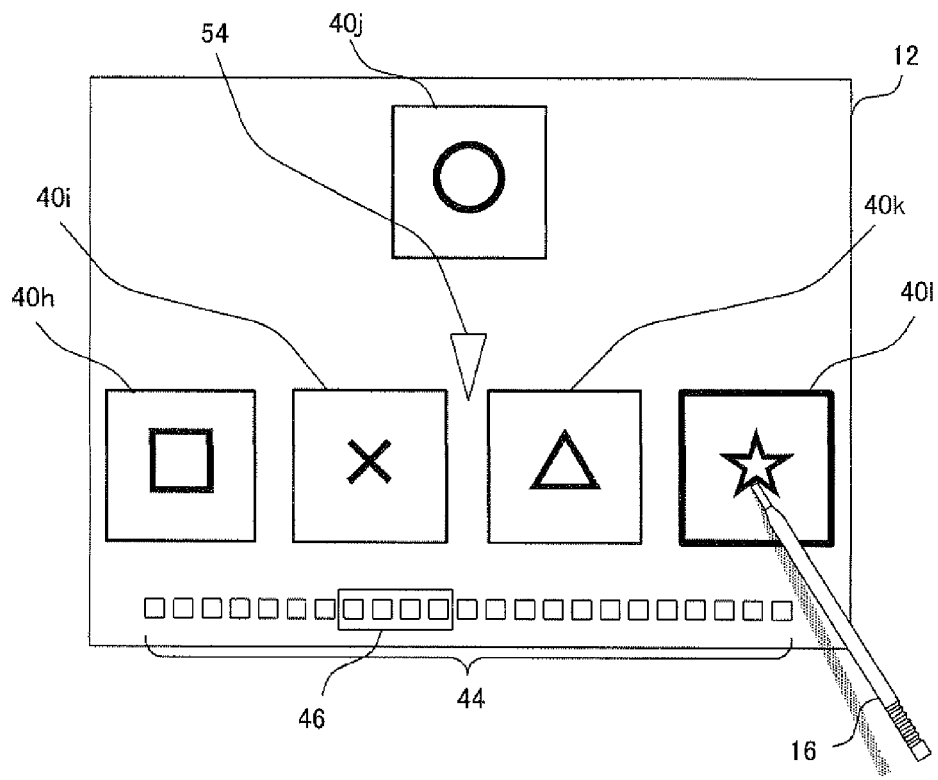
FIG. 17 is a diagram illustrating an image displayed on the screen of the second LCD 12.

FIG. 17 shows an exemplary screen on which a user touches the icon 40l by using the stick 16 in the state (that is, a state where the saved icon exists) shown in FIG. 16. When a user touches the icon 40l by using the stick 16, the touched icon 40l is highlighted.

Figure 18:
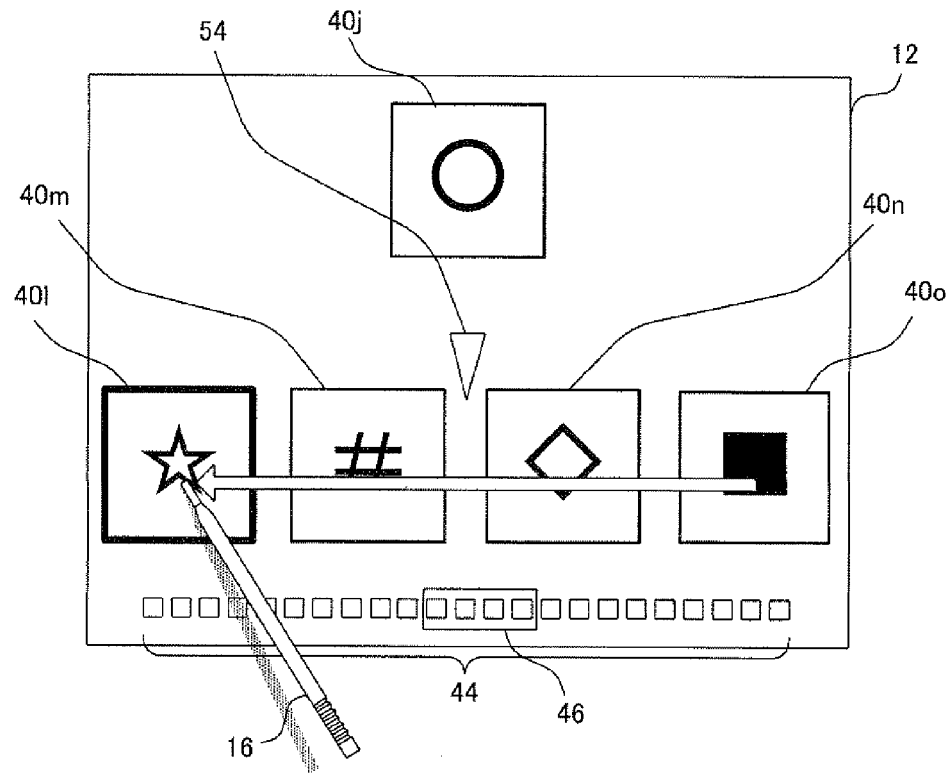
FIG. 18 is a diagram illustrating an image displayed on the screen of the second LCD 12.

When in the state (that is, a state where when the saved icon exists, one of the icons in the icon line is touched by the stick 16) shown in FIG. 17 a user slides the stick 16 leftward on the screen, the icon line displayed on the icon line display area is scrolled leftward in accordance with a sliding distance over which the stick 16 is slid, as shown in FIG. 18. When a user slides the stick 16 rightward on the screen, the icon line displayed on the icon line display area is scrolled rightward in accordance with a sliding distance over which the stick 16 is slid. Thus, also when the saved icon exists, as in the state where no saved icon exists, a point in the scroll area 48 (see FIG. 7) is touched by using the stick 16, the stick 16 touching the point is laterally slid, thereby allowing a user to scroll the icon line.

Figure 19:
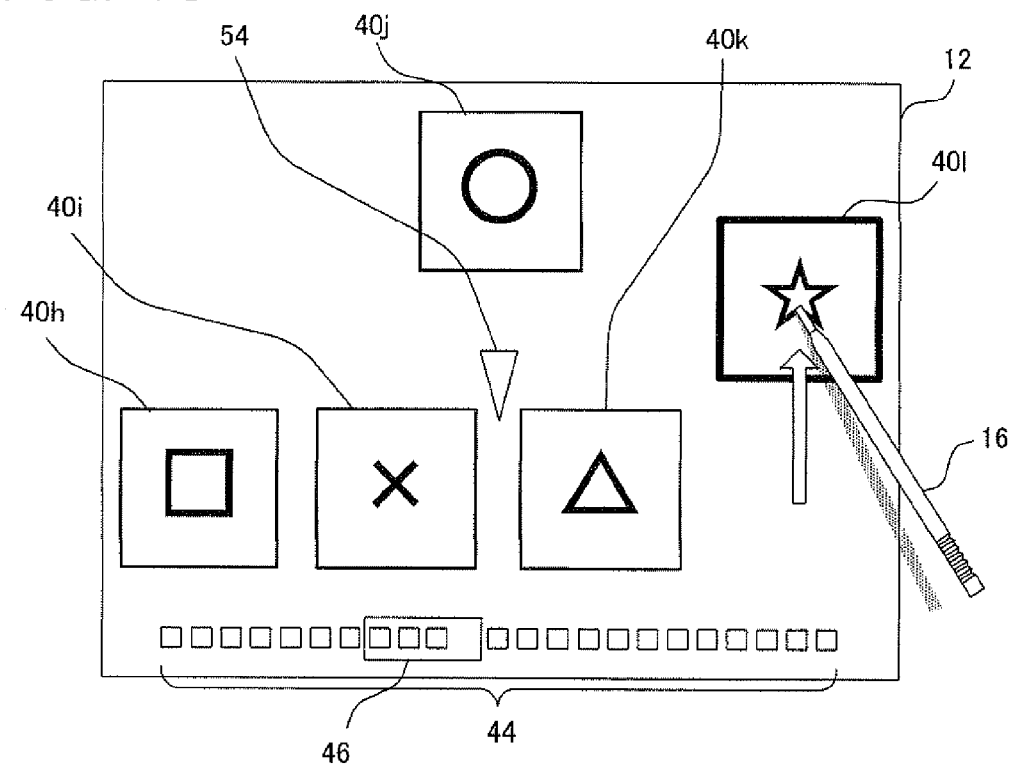
FIG. 19 is a diagram illustrating an image displayed on the screen of the second LCD 12.
Figure 20:
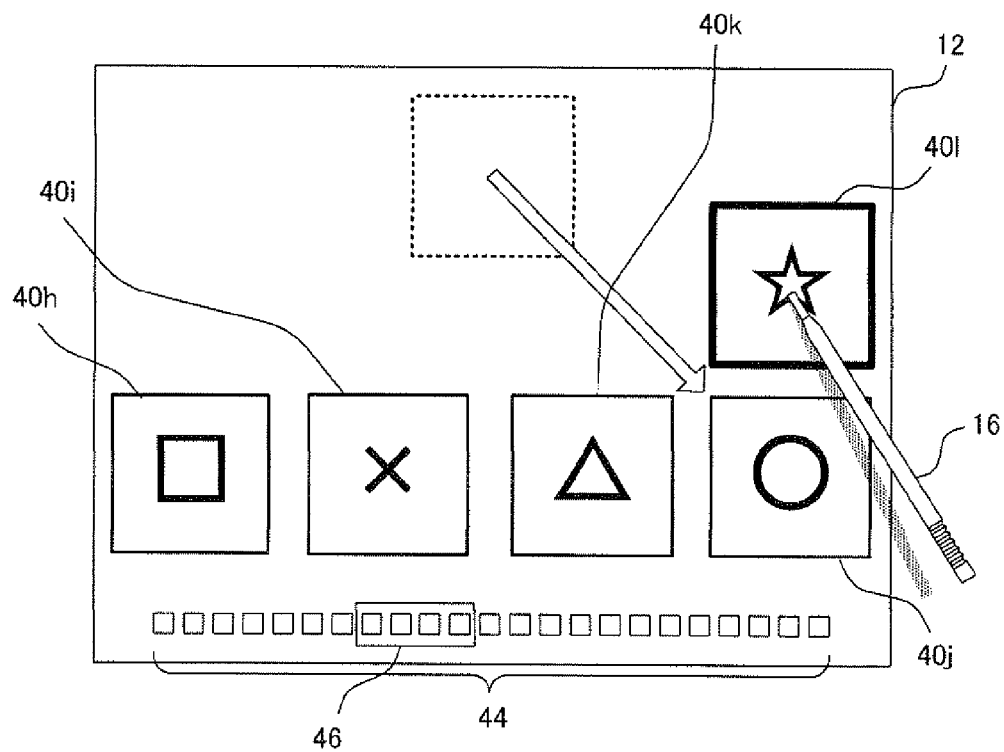
FIG. 20 is a diagram illustrating an image displayed on the screen of the second LCD 12.

When in the state (that is, a state where when the saved icon exists, one of the icons in the icon line is touched by the stick 16) shown in FIG. 17 a user slides the stick 16 upward on the screen, the icon 40l moves upward so as to follow the stick 16, and the icon 40l is extracted from the icon line as shown in FIG. 19, and further interchange between the icon 40l and the icon 40j which is the saved icon is performed such that the icon 40j is inserted in the icon line, as shown in FIG. 20. Also when a user slides the stick 16 downward, the icon 40l moves downward so as to follow the stick 16, and the icon 40l is extracted from the icon line, and further interchange between the icon 40l and the icon 40j is performed such that the icon 40j is inserted in the icon line. Thus, an operation for inserting the icon 40j in the icon line and an operation for extracting the icon 40l from the icon line are realized by performing a single sliding operation, thereby improving operation efficiency.

In the present embodiment, some useful icon operation methods, other than the various icon operation methods described above, can be used. For example, when in the state (that is, a state where neither the dragged icon nor the saved icon exists) shown in FIG. 3 a user taps the stick 16 on the icon 40j displayed at the center of the icon line display area, the icon 40j on which the user taps the stick 16 opens (that is, a program represented by the icon 40j is executed). Further, for example, when in the state (that is, a state where neither the dragged icon nor the saved icon exists) shown in FIG. 3 a user taps the stick 16 on an icon (the icon 40h, 40i, 40k, or 40l) other than the icon 40j displayed at the center of the icon line display area, the icon line is scrolled such that the icon on which the user taps the stick 16 moves toward the center of the icon line display area.

Some of the icon operation methods as described above may be performed by using a hardware switch (the operation switch section 14 shown in FIG. 2). For example, when in the state (that is, a state where neither the dragged icon nor the saved icon exists) shown in FIG. 3 a user presses the A button 14d, the icon 40j displayed at the center position of the icon line display area opens. Further, when in the state (that is, a state where neither the dragged icon nor the saved icon exists) shown in FIG. 3 a user presses an upper button (that is, the upper portion of the cross switch 14a) the icon 40j displayed at the center position of the icon line display area is saved in the saving area 50 as shown in FIG. 16. Further, when in the state (that is, a state where neither the dragged icon nor the saved icon exists) shown in FIG. 3 or in the state (that is, a state where the saved icon exists) shown in FIG. 16 a user presses a right button (that is, the right portion of the cross switch 14a), the icon line is scrolled rightward on the screen by a distance corresponding to one icon. Further, when in the state (that is, a state where neither dragged icon nor the saved icon exists) shown in FIG. 3 or in the state (that is, a state where the saved icon exists) shown in FIG. 16 a user presses a left button (that is, the left portion of the cross switch 14a), the icon line is scrolled leftward on the screen by a distance corresponding to one icon. Furthermore, when in the state (that is, a state where the saved icon exists) shown in FIG. 16 a user presses a lower button (that is, the lower portion of the cross switch 14a), the saved icon 40j is inserted in the icon line at a center position indicated by the mark 54.

Next, an operation performed by the game apparatus 10 based on the object display order changing program will be described in more detail with reference to FIGS. 21 to 26.

Figure 21:
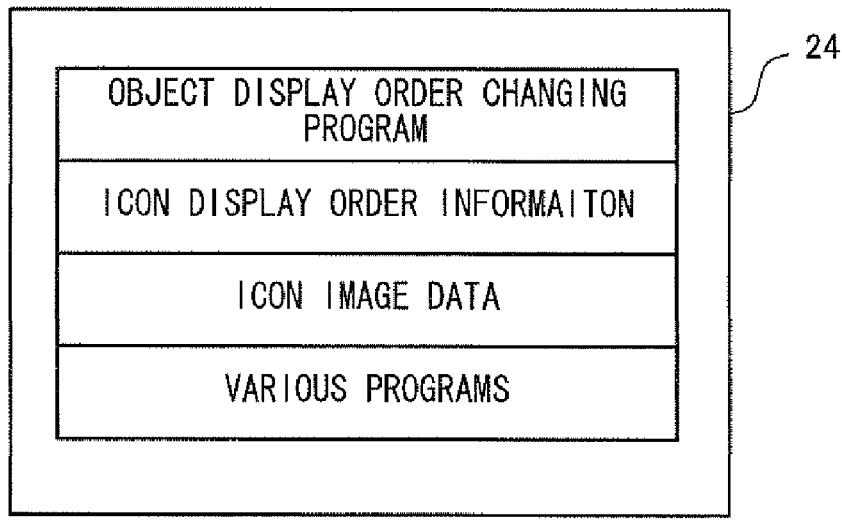
FIG. 21 shows a memory map of the RAM 24.

FIG. 21 shows a memory map of the RAM 24. The RAM 24 stores the object display order changing program, icon display order information, as shown in FIG. 4, representing the display order in which the icons are displayed, icon image data corresponding to the respective icons, and various programs associated with the respective icons.

Figure 22:
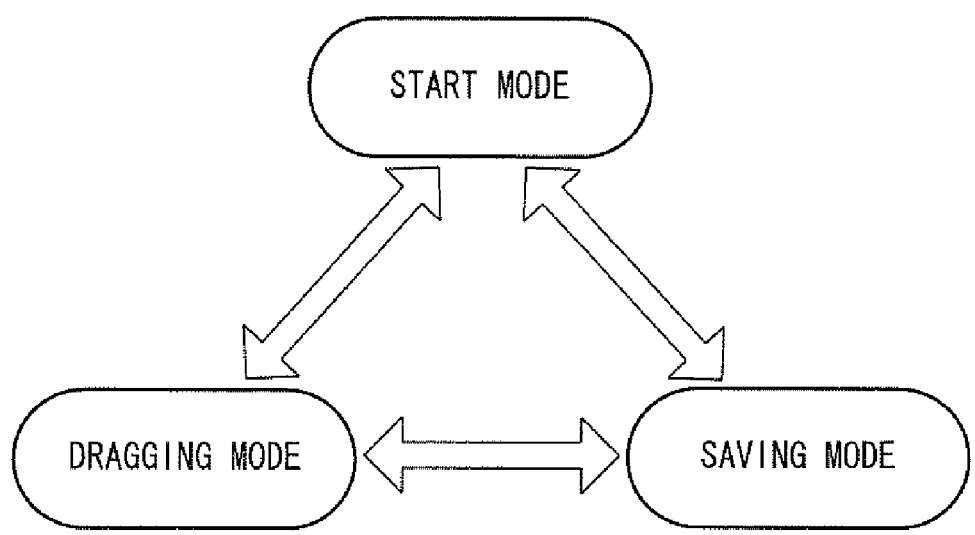
FIG. 22 is a diagram illustrating a relationship among a start mode, a dragging mode, and a saving mode.

When the object display order changing program is executed, the process is performed in three main process modes, a start mode, a dragging mode, and a saving mode, as shown in FIG. 22. The start mode is a process mode for a state (for example, states shown in FIG. 3, FIG. 5, FIG. 6, and FIG. 12) in which neither the dragged icon nor the saved icon exists. The dragging mode is a process mode for a state (for example, states shown in FIG. 8, FIG. 9, FIG. 10, FIG. 13, FIG. 15, FIG. 19, and FIG. 20) in which the dragged icon exists. The saving mode is a process mode for a state (for example, the states shown in FIG. 16, FIG. 17, and FIG. 18) where the dragged icon does not exist, and the saved icon exists). The process shifts among these three modes in accordance with an operation performed by a user.

FIG. 23 shows contents of operations, performed by a user, corresponding to mode shift patterns, respectively. In FIG. 23, "touch operation" represents an operation performed by using the touch panel 15, and "key operation" represents an operation performed by using the operation switch section 14 (such as the cross switch 14a and the A button 14d shown in FIG. 1) shown in FIG. 2.

A shift from the start mode to the dragging mode is performed by a user dragging vertically one of the icons in the icon line displayed on the screen.

A shift from the start mode to the saving mode is performed by a user pressing the upper button.

A shift from the dragging mode to the start mode is performed by a user dropping the dragged icon outside the saving area 50.

A shift from the dragging mode to the saving mode is performed by a user dropping the dragged icon in the saving area 50.

A shift from the saving mode to the start mode is performed by a user tapping on the saved icon or pressing the lower button.

A shift from the saving mode to the dragging mode is performed by a user dragging the saved icon.

Next, a flow of process performed by the CPU core 21 in each process mode will be described with reference to flow charts of FIGS. 24 to 26. Although each flow chart does not show process associated with generation and output of an image, the generation and output of the image is performed at regular time intervals.

Immediately after execution of the icon display order changing program is started, the process is performed in the start mode. FIG. 24 is a flow chart showing a flow of process performed by the CPU core 21 in the start mode.

In step S10, the CPU core 21 determines whether or not a key input is made based on a signal from the operation switch section 14, and when the key input is made, the process advances to step S11, and otherwise the process advances to step S20.

In step S11, the CPU core 21 determines whether or not the upper button is pressed, and when the upper button is pressed, the process advances to step S12, and otherwise the process advances to step S13.

In step S12, the CPU core 21 withdraws the balloon 42, and saves, in the saving area 50, an icon displayed at the center position of the icon line display area. When step S12 ends, the process shifts to the saving mode.

In step S13, the CPU core 21 determines whether or not one of the right button or the left button is pressed, and when one of the right button or the left button is pressed, the process advances to step S14, and otherwise the process advances to step S16.

In step S14, the CPU core 21 scrolls and displays the icon line. Specifically, the CPU core 21 displays the icon line being scrolled rightward on the screen when the right button is pressed, and displays the icon line being scrolled leftward on the screen when the left button is pressed. At this time, the icon line is scrolled and displayed such that the icons are sequentially positioned at the center position of the icon line display area.

In step S15, the CPU core 21 determines whether or not the key input is being continued (that is, whether or not one of the right button or the left button is being still pressed), and when the key input is being continued, the process returns to step S14, and otherwise the process returns to step S10.

In step S16, the CPU core 21 determines whether or not the A button is pressed, and when the A button is pressed, the execution of the icon display order changing program is ended, and the icon displayed at the center of the icon line display area is opened (that is, the program associated with the icon displayed at the center thereof is started).

In step S20, the CPU core 21 detects a touch position based on a signal from the touch panel 15. In the present embodiment, the touch position is represented as a two-dimensional coordinate (X, Y) for which the X-axis direction represents the lateral direction of the screen, and the Y-axis direction represents the vertical direction of the screen. The touch position detected in step S20 is stored in the RAM 24 as a touch-on position (a touch position detected earliest after a state where the stick 16 does not touch the touch panel 15 shifts to a state where the stick 16 touches the touch panel 15).

In step S21, the CPU core 21 determines whether or not the touch position is on an icon, and when the touch position is on an icon, the process advances to step S26, and otherwise the process advances to step S22.

In step S22, the CPU core 21 determines whether or not the touch position is in the scroll area 48, and when the touch position is in the scroll area 48, the process advances to step S23, and otherwise the process returns to step S10.

In step S23, the CPU core 21 detects a touch position based on a signal from the touch panel 15.

In step S24, the CPU core 21 scrolls and displays the icon line based on the touch-on position (that is, the touch position detected and stored in step S20) and the most recent touch position (that is, the touch position detected in step S23). Specifically, the CPU core 21 determines a scrolling direction based on whether an X-coordinate value of the touch-on position is greater than or smaller than an X-coordinate value of the most recent touch position, and determines a scroll width (a moving distance over which the icon line moves on the screen) based on an absolute value of a difference between the X-coordinate value of the touch-on position and the X-coordinate value of the most recent touch position.

In step S25, the CPU core 21 determines whether or not touch-off is performed (that is, whether or not the stick 16 is moved away from the touch panel 15) based on a signal from the touch panel 15, and when the touch-off is performed, the process returns to step S10, and otherwise the process returns to step S23.

In step S26, the CPU core 21 highlights the icon touched by a user.

In step S27, the CPU core 21 detects a touch position based on a signal from the touch panel 15.

In step S28, the CPU core 21 determines whether or not a moving distance (that is, an absolute value of a difference between the X-coordinate value of the touch-on position and an X-coordinate value of the most recent touch position) over which the touch position moves in the X-axis direction is greater than a predetermined threshold value, and when the moving distance over which the touch position moves in the X-axis direction is greater than the predetermined threshold value (in this case, a user intends to scroll the icon line laterally), the process advances to step S29, and otherwise the process advances to step S34.

In step S29, the CPU core 21 detects a touch position based on a signal from the touch panel 15.

In step S30, the CPU core 21 determines whether or not a moving distance (that is, an absolute value of a difference between a Y-coordinate value of the touch-on position and a Y-coordinate value of the most recent touch position) over which the touch position moves in the Y-axis direction is greater than a predetermined threshold value, and when the moving distance over which the touch position moves in the Y-axis direction is greater than the predetermined threshold value (in this case, a user intends to extract a desired icon from the icon line), the process shifts to the dragging mode, and otherwise the process advances to step S31. Thus, even after a user scrolls the icon line by dragging laterally one of the icons displayed on the icon line display area, the user is allowed to extract the icon from the icon line by dragging the icon vertically.

In a case where the threshold value used in step S30 is too small, when a user intends to scroll the icon line, an icon is likely to be extracted from the icon line to stop scrolling and displaying the icon line, against the user's intention. Therefore, it is necessary to set the threshold value used in step S30 as an appropriate value based on the operability. In order to effectively prevent such an erroneous operation, in an exemplary modification, the threshold value used in step S30 may be increased in accordance with the moving distance in the X-axis direction being increased. Further, in another exemplary modification, whether or not a change rate (for example, a change amount of the Y-axis coordinate value obtained during a most recent predetermined time period) at which the touch position moves in the Y-axis direction is greater than a predetermined threshold value may be determined, in step S30, instead of whether or not the moving distance over which the touch position moves in the Y-axis direction is greater than a predetermined threshold value. Moreover, in still another exemplary modification, only when the moving distance in the Y-axis direction is greater than the moving distance in the X-axis direction, whether or not a user intends to extract an icon from the icon line may be determined. Furthermore, in still another exemplary modification, in a case where the icon line is once scrolled, only when the touch-off is performed, an icon may be extracted from the icon line (that is, process step of step S30 may be eliminated).

In step S31, the CPU core 21 scrolls and displays the icon line based on the touch-on position (that is, the touch position detected and stored in step S20) and the most recent touch position (that is, the touch position detected in step S29). Specifically, the CPU core 21 determines a scrolling direction based on whether the X-coordinate value of the touch-on position is greater than or smaller than an X-coordinate value of the most recent touch position, and determines a scroll width based on an absolute value of a difference between the X-coordinate value of the touch-on position and the X-coordinate value of the most recent touch position.

In step S32, the CPU core 21 determines whether or not the touch-off is performed, based on a signal from the touch panel 15, and when the touch-off is performed, the process advances to step S33, and otherwise the process returns to step S29.

In step S33, the CPU core 21 cancels the highlighting performed for the icon in step S26.

In step S34, the CPU core 21 determines whether or not the moving distance over which the touch position moves in the Y-axis direction is greater than a predetermined threshold value, and when the moving distance over which the touch position moves in the Y-axis direction is greater than the predetermined threshold value (in this case, a user intends to extract a desired icon from the icon line), the process shifts to the dragging mode, and otherwise the process advances to step S35.

In step S35, the CPU core 21 determines whether or not the touch-off is performed, based on a signal from the touch panel 15, and when the touch-off is performed (in this case, a user taps on a desired icon), the process advances to step S36, and otherwise the process returns to step S27.

In step S36, the CPU core 21 cancels the highlighting performed for the icon in step S26.

In step S37, the CPU core 21 determines whether or not the icon (that is, the icon having been most recently touched before the touch-off) on which a user taps is an icon displayed at the center of the icon line display area, and when the icon is the icon displayed at the center of the icon line display area, the execution of the icon display order changing program is ended, and the icon displayed at the center of the icon line on the screen is opened. Otherwise, the process advances to step S38.

In step S38, the CPU core 21 scrolls and displays the icon line so as to move, toward the center of the screen, the icon on which the user taps, and the process returns to step S10.

Figure 25:
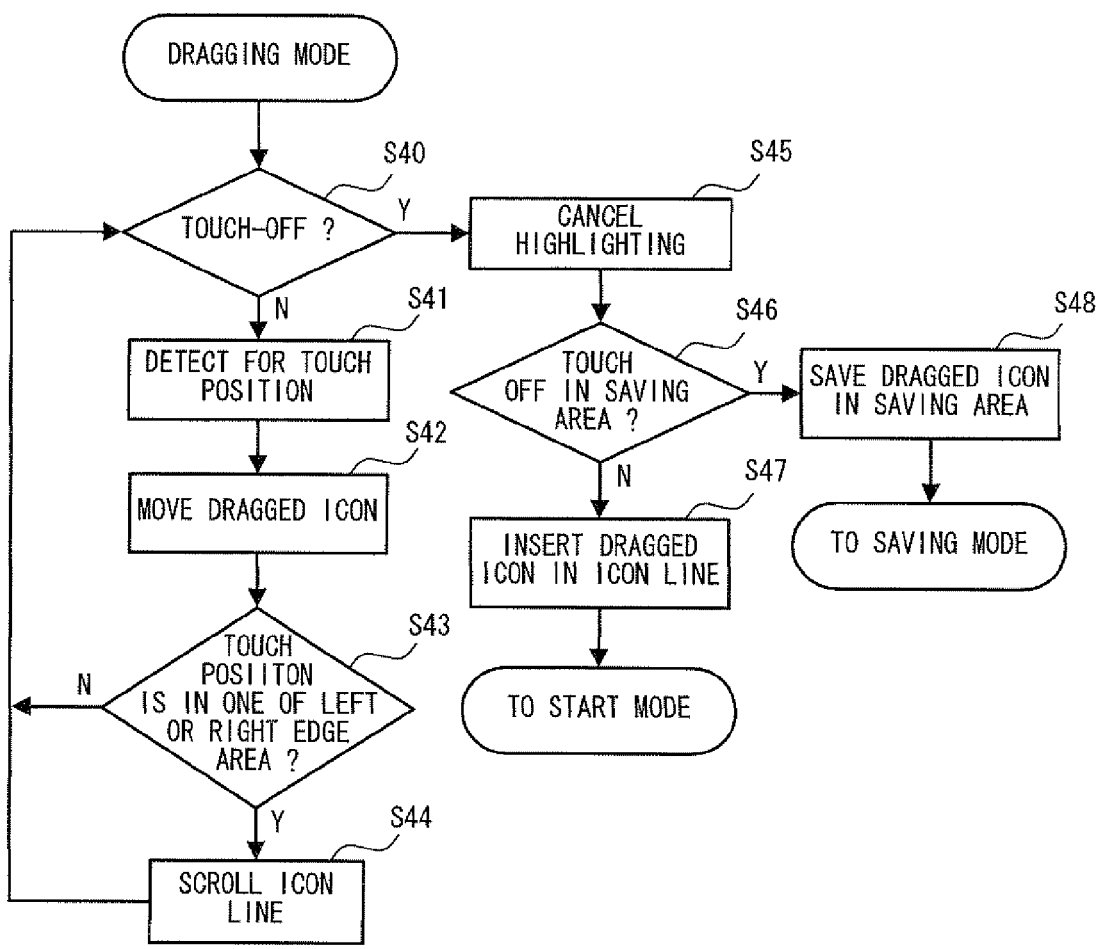
FIG. 25 is a flow chart showing an operation performed by the game apparatus 10 in the dragging mode.

FIG. 25 is a flowchart showing a flow of process performed by the CPU core 21 in the dragging mode.

In step S40, the CPU core 21 determines whether or not the touch-off is performed, based on a signal from the touch panel 15, and when the touch-off is performed, the process advances to step S45, and otherwise the process advances to step S41.

In step S41, the CPU core 21 detects a touch position based on a signal from the touch panel 15.

In step S42, the CPU core 21 moves the dragged icon so as to follow the most recent touch position (that is, the touch position detected in step S41), based on the most recent touch position.

In step S43, the CPU core 21 determines whether or not the touch position is in one of the right edge area 52R or the left edge area 52L, and when the touch position is in one of the right edge area 52R or the left edge area 52L, the process advances to step S44, and otherwise the process returns to step S40.

In step S44, the CPU core 21 scrolls and displays the icon line. Specifically, the CPU core 21 displays the icon line being scrolled leftward on the screen by a predetermined width when the touch position is in the right edge area 52R, and displays the icon line being scrolled rightward on the screen by a predetermined width when the touch position is in the left edge area 52L. The closer the touch position is to the edge of the icon line display area, the greater the scroll width may be (that is, the higher the scrolling rate may be). When step S44 ends, the process returns to step S40.

In step S45, the CPU core 21 cancels the highlighting performed for the icon in step S26 or in step S66 described later.

In step S46, the CPU core 21 determines whether or not a touch-off position (a touch position having been most recently detected before touch-off is performed) is in the saving area 50, and when the touch-off position is in the saving area 50, the process advances to step S48, and otherwise the process advances to step S47.

In step S47, the CPU core 21 inserts the dragged icon in the icon line. Specifically, the CPU core 21 inserts the dragged icon between two icons, adjacent to each other in the icon line, which are closest to the touch-off position. When step S47 ends, the process shifts to the start mode.

In step S48, the CPU core 21 saves the dragged icon in the saving area 50. Specifically, the CPU core 21 moves the dragged icon to the center of the saving area 50. When step S48 ends, the process shifts to the saving mode.

Figure 26:
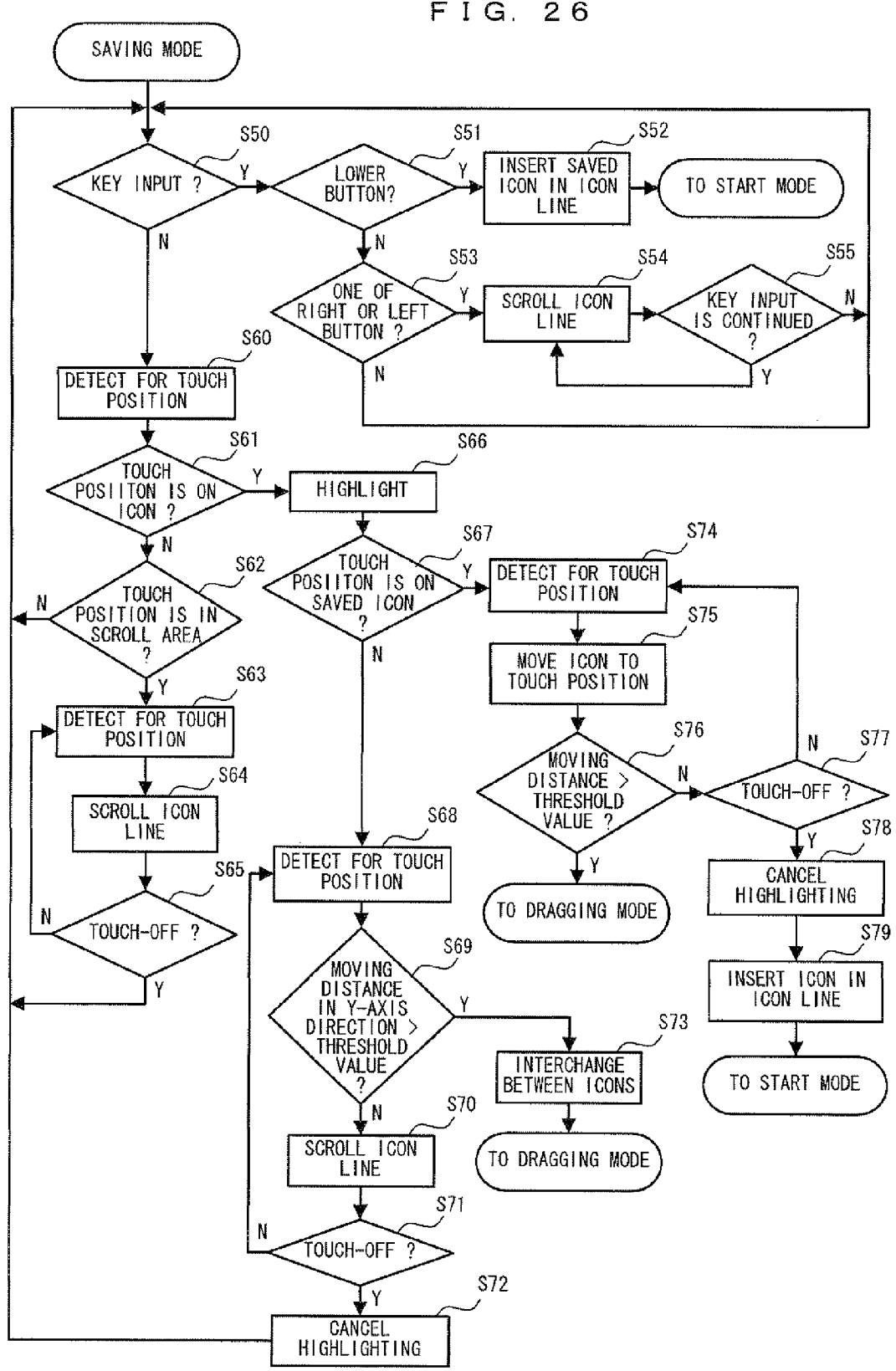
FIG. 26 is a flow chart illustrating an operation performed by the game apparatus 10 in the saving mode.

FIG. 26 is a flow chart showing a flow of process performed by the CPU core 21 in the saving mode.

In step S50, the CPU core 21 determines whether or not a key input is made, based on a signal from the operation switch section 14, and when a key input is made, the process advances to step S51, and otherwise the process advances to step S60.

In step S51, the CPU core 21 determines whether or not the lower button is pressed, and when the lower button is pressed, the process advances to step S52, and otherwise the process advances to step S53.

In step S52, the CPU core 21 inserts the saved icon in a clearance centered in the icon line displayed in the icon line display area. When step S52 ends, the process shifts to the start mode.

In step S53, the CPU core 21 determines whether or not one of the right button or the left button is pressed, and when one of the right button or the left button is pressed, the process advances to step S54, and otherwise the process returns to step S50.

In step S54, the CPU core 21 scrolls and displays the icon line. Specifically, the CPU core 21 displays the icon line being scrolled rightward on the screen when the right button is pressed, and the CPU core 21 displays the icon line being scrolled leftward on the screen when the left button is pressed. At this time, the icon line is scrolled and displayed such that the two adjacent icons sequentially sandwich the center position of the icon line display area.

In step S55, the CPU core 21 determines whether or not the key input is being continued (that is, whether or not one of the right button or the left button is being still pressed), and when the key input is being continued, the process returns to step S54, and otherwise the process returns to step S50.

In step S60, the CPU core 21 detects a touch position, based on a signal from the touch panel 15. The touch position detected in step S60 is stored in the RAM 24 as the touch-on position.

In step S61, the CPU core 21 determines whether or not the touch position is on an icon, and when the touch position is on an icon, the process advances to step S66, and otherwise the process advances to step S62.

In step S62, the CPU core 21 determines whether or not the touch position is in the scroll area 4S, and when the touch position is in the scroll area 48, the process advances to step S63, and otherwise the process returns to step S50.

In step S63, the CPU core 21 detects a touch position, based on a signal from the touch panel 15.

In step S64, the CPU core 21 scrolls and displays the icon line, based on the touch-on position (that is, the touch position detected and stored in step S60) and the most recent touch position (that is, the touch position detected in step S63). Specifically, the CPU core 21 determines a scrolling direction based on whether an X-coordinate value of the touch-on position is greater than or smaller than an X-coordinate value of the most recent touch position, and determines a scroll width based on an absolute value of a difference between the X-coordinate value of the touch-on position and the X-coordinate value of the most recent touch position.

In step S65, the CPU core 21 determines whether or not the touch-off is performed, based on a signal from the touch panel 15, and when the touch-off is performed, the process returns to step S50, and otherwise the process returns to step S63.

In step S66, the CPU core 21 highlights the icon touched by a user.

In step S67, the CPU core 21 determines whether or not the touch position is on the saved icon, and when the touch position is on the saved icon, the process advances to step S74, and otherwise (in this case, one of the icons in the icon line display area is touched) the process advances to step S68.

In step S68, the CPU core 21 detects a touch position, based on a signal from the touch panel 15.

In step S69, the CPU core 21 determines whether or not a moving distance over which the touch position moves in the Y-axis direction is greater than a predetermined threshold value, and when the moving distance over which the touch position moves in the Y-axis direction is greater than the predetermined threshold value (in this case, a user intends to extract a desired icon from the icon line so as to interchange between the desired icon and the saved icon), the process advances to step S73, and otherwise the process advances to step S70.

In step S70, the CPU core 21 scrolls and displays the icon line, based on the touch-on position (that is, the touch position detected and stored in step S60) and the most recent touch position (that is, the touch position detected in step S68). Specifically, the CPU core 21 determines a scrolling direction based on whether the X-coordinate value of the touch-on position is greater than or smaller than an X-coordinate value of the most recent touch position, and determines a scroll width based on an absolute value of a difference between the X-coordinate value of the touch-on position and the X-coordinate value of the most recent touch position.

In step S71, the CPU core 21 determines whether or not the touch-off is performed, based on a signal from the touch panel 15, and when the touch-off is performed, the process advances to step S72, and otherwise the process returns to step S68.

In step S72, the CPU core 21 removes the highlight of the icon, which is provided in step S66.

In step S73, the CPU core 21 interchanges between the saved icon and the icon being currently touched. Specifically, the CPU core 21 moves the saved icon to a position of the icon being currently touched so as to interchange between the saved icon and the icon being currently touched. When the process step of step S73 ends, the process shifts to the dragging mode.

In step S74, the CPU core 21 detects a touch position, based on a signal from the touch panel 15.

In step S75, the CPU core 21 moves the saved icon so as to follow the most recent touch position (that is, the touch position detected in step S74), based on the most recent touch position.

In step S76, the CPU core 21 determines whether or not the moving distance (a moving distance based on both a moving distance in the X-axis direction and a moving distance in the Y-axis direction, such as, for example, a distance between the touch-on position and the most recent touch position) over which the touch position moves is greater than a predetermined threshold value, and when the moving distance over which the touch position move is greater than the predetermined threshold value (in this case, a user intends to drag the saved icon), the process shifts to the dragging mode, and otherwise the process advances to step S77.

In step S77, the CPU core 21 determines whether or not the touch-off is performed, based on a signal from the touch panel 15, and when the touch-off is performed (in this case, a user intends to tap on the saved icon), the process advances to step S78, and otherwise the process returns to step S74.

In step S78, the CPU core 21 removes the highlight of the icon, which is provided in step S66.

In step S79, the CPU core 21 inserts the saved icon in the icon line displayed on the icon line display area at the centered clearance. When step S79 ends, the process shifts to the start mode.

As described above, according to the present embodiment, a user is allowed to easily change the display order in which a plurality of objects are displayed on the icon line display area.

In particular, according to the present embodiment, in a case where an icon included in the icon line displayed on the icon line display area is touched by the stick 16, when the stick 16 touching the icon is laterally slid, it is possible to scroll the entire icon line, and when the stick 16 touching the icon is vertically slid, it is possible to extract and drag the touched icon from the icon line. Therefore, unlike in a conventional art, it is unnecessary to provide a scroll box in an area other than a display area (corresponding to the icon line display area of the present embodiment) of the icon line, thereby making effective use of a limited screen size. Further, in a conventional art, the wider an area allocated as a display area of the icon line is, the narrower an area for providing a scroll box is, so that the scroll box is narrowed, and it is difficult to designate a position on the scroll box by using a pointing device. However, according to the present embodiment, even when a wide area is allocated as the display area of the icon line, a wide area can be used for the scroll area 48 so as to include the display area of the icon line, and therefore the display area of the icon line can be sufficiently widen without deteriorating the operability for scrolling operation.

Figure 31:
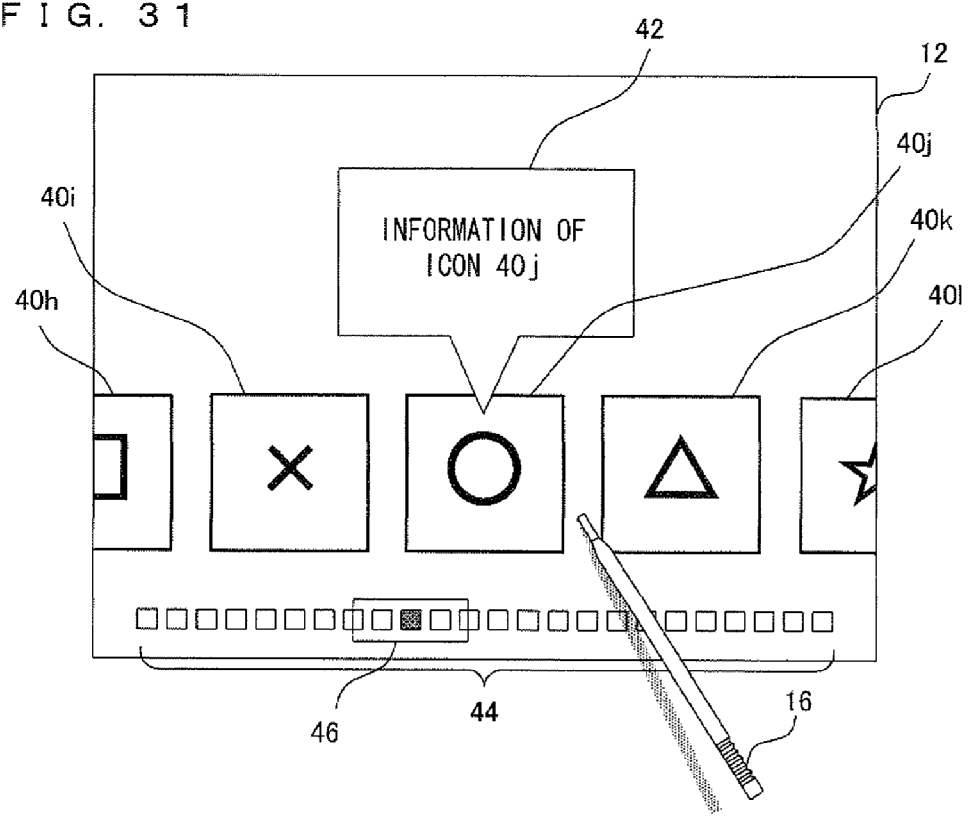
FIG. 31 is a diagram illustrating an image displayed on the screen of the second LCD 12.
Figure 32:
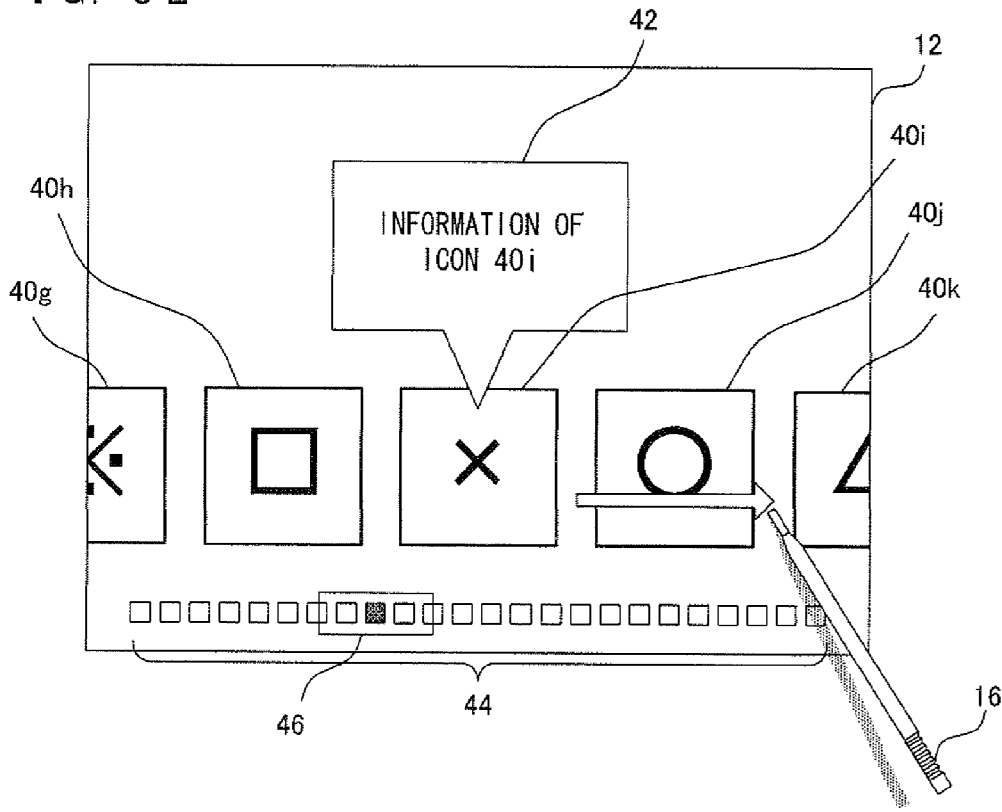
FIG. 32 is a diagram illustrating an image displayed on the screen of the second LCD 12.
Figure 33:
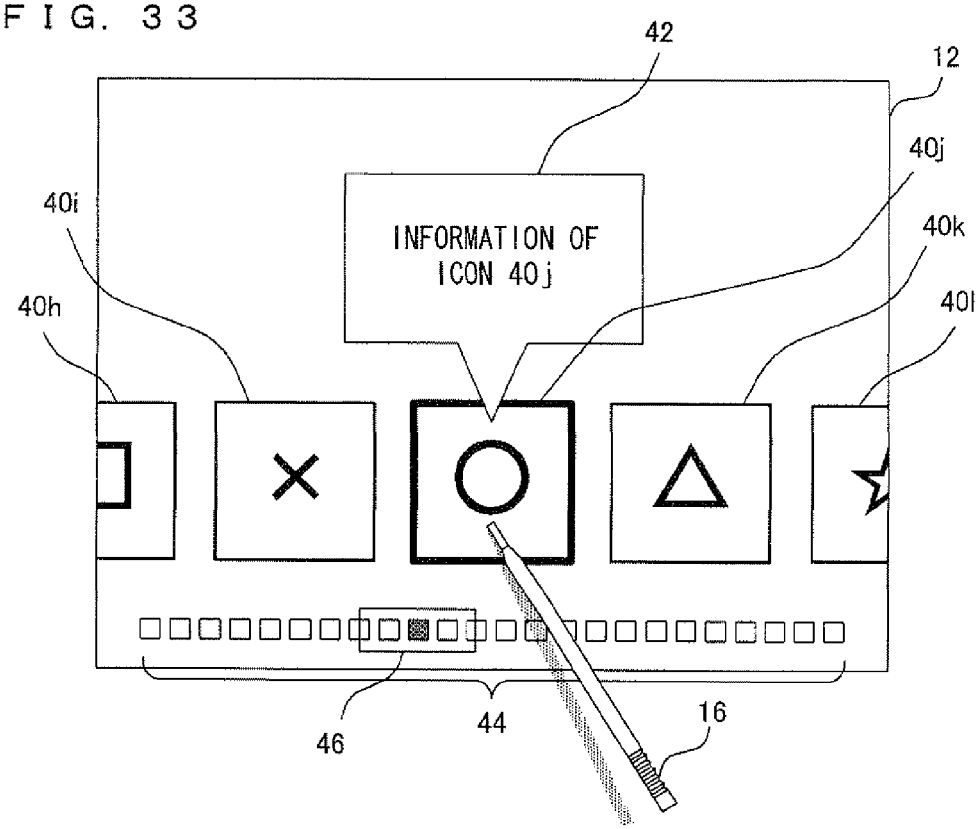
FIG. 33 is a diagram illustrating an image displayed on the screen of the second LCD 12.
Figure 34:
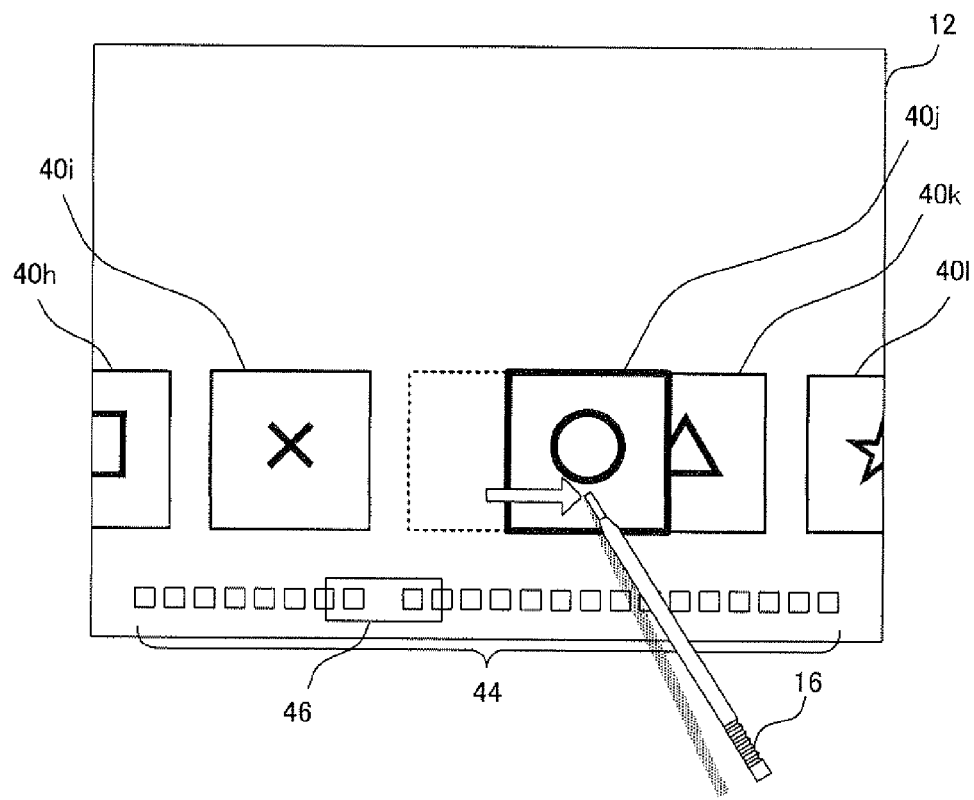
FIG. 34 is a diagram illustrating an image displayed on the screen of the second LCD 12.

In an exemplary modification, when a point, in the icon line display area, other than a point on an icon is touched by the stick 16 as shown in FIG. 31, and then the stick 16 touching the point is laterally slid as shown in FIG. 32, the entire icon line is scrolled. When a point on an icon is touched by the stick 16 as shown in FIG. 33, and then the stick 16 touching the point is slid in a desired direction (the stick 16 may be laterally slid) as shown in FIG. 34, the touched icon may be extracted and dragged from the icon line. Thus, as in the embodiment described above, it is unnecessary to provide a scroll box in an area other than the display area (corresponding to the icon line display area of the present embodiment) of the icon line, thereby making effective use of a limited screen size.

In the present embodiment, an exemplary case where a touch panel is used is described, the present invention is not limited thereto, and any other coordinate input means such as a mouse, a joystick, or a touch pad may be used.

Further, although, in the present embodiment, when the dragged icon is dropped at any desired point outside the saving area 50, the dragged icon is inserted in the icon line, the present invention is not limited thereto, and when the dragged icon is dropped in a specific area (for example, an area distanced from the icon line by a predetermined distance or less), the dragged icon may be inserted in the icon line.

Further, the icon line display area as shown in FIG. 3, the scroll area 48 as shown in FIG. 7, the saving area 50 as shown in FIG. 11, and the right edge area 52R and the left edge area 52L as shown in FIG. 14 are each simply an example, the position and the size thereof may be changed as necessary. For example, each of the right edge area 52R and the left edge area 52L may extend from the top of the screen to the bottom thereof.

Further, in step S43 and step S44 shown in FIG. 25, when the touch position is in the right edge area 52R or the left edge area 52L, the icon line is scrolled and displayed. However, the present invention is not limited thereto. When apart (for example, one of the four corners) of the dragged icon enters the right edge area 52R or the left edge area 52L, the icon line may be scrolled and displayed. Also in step S46 shown in FIG. 25, the similar determination may be made.

Figure 24:
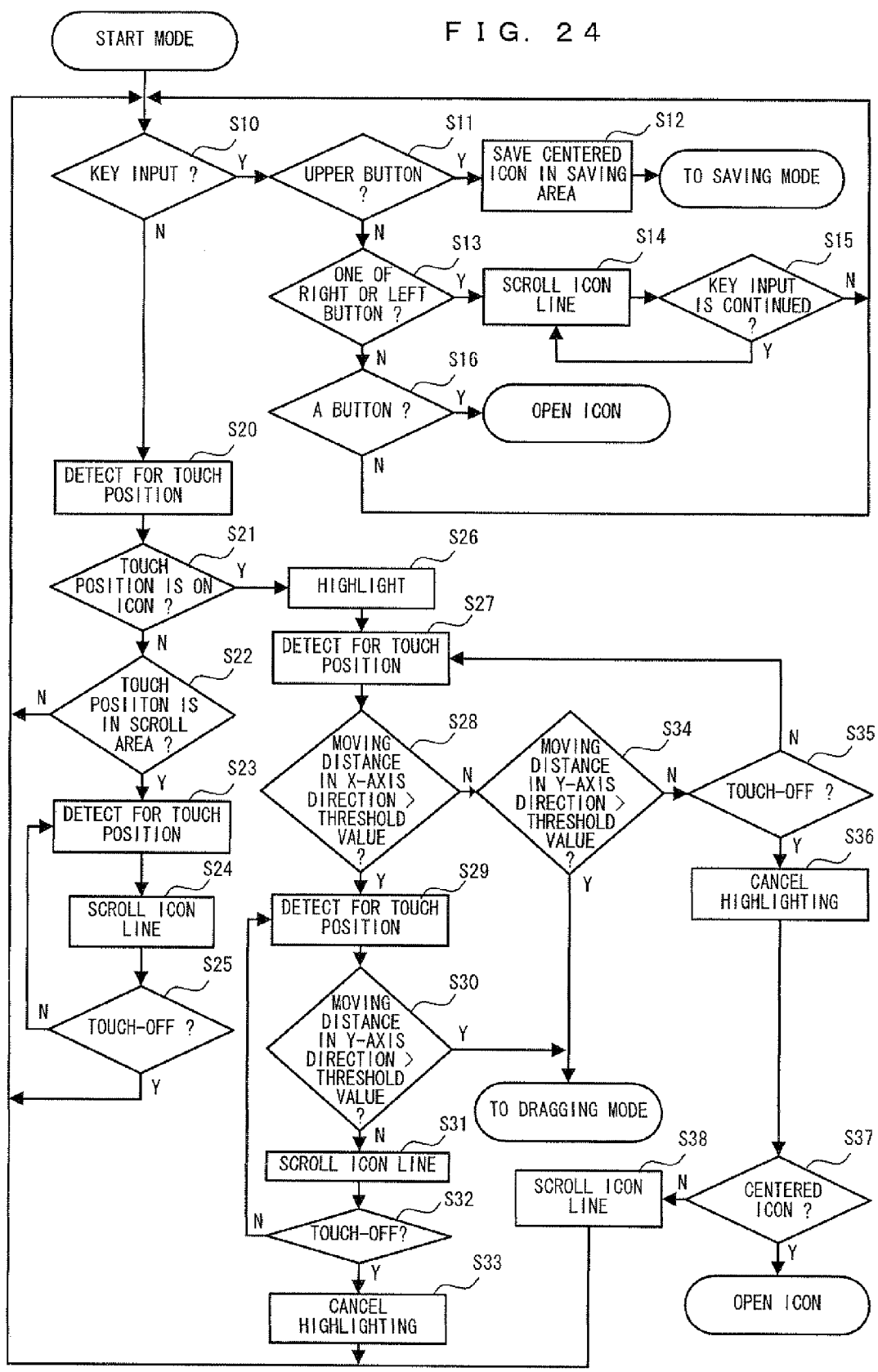
FIG. 24 is a flow chart showing an operation performed by the game apparatus 10 in the start mode.

Each of the threshold values used in step S28, step S30, and step S34 shown in FIG. 24, and step S69 shown in FIG. 26 may be individually set as an appropriate value.

Further, although in the present embodiment the icon line is displayed so as to be aligned laterally in line, the present invention is not limited thereto, and the icon line may be displayed so as to be aligned vertically in line.

Further, although in the present embodiment the number of the icon lines displayed on the icon line display area is one, the present invention is not limited thereto, and the number of the icon lines displayed on the icon line display area may be greater than one.

Moreover, although in the present embodiment the display order in which a plurality of icons are displayed is changed, the present invention is not limited thereto. The display order in which any other objects, other than icons, such as images, characters, marks, and 3D objects, are displayed can be effectively changed.

Figure 27:
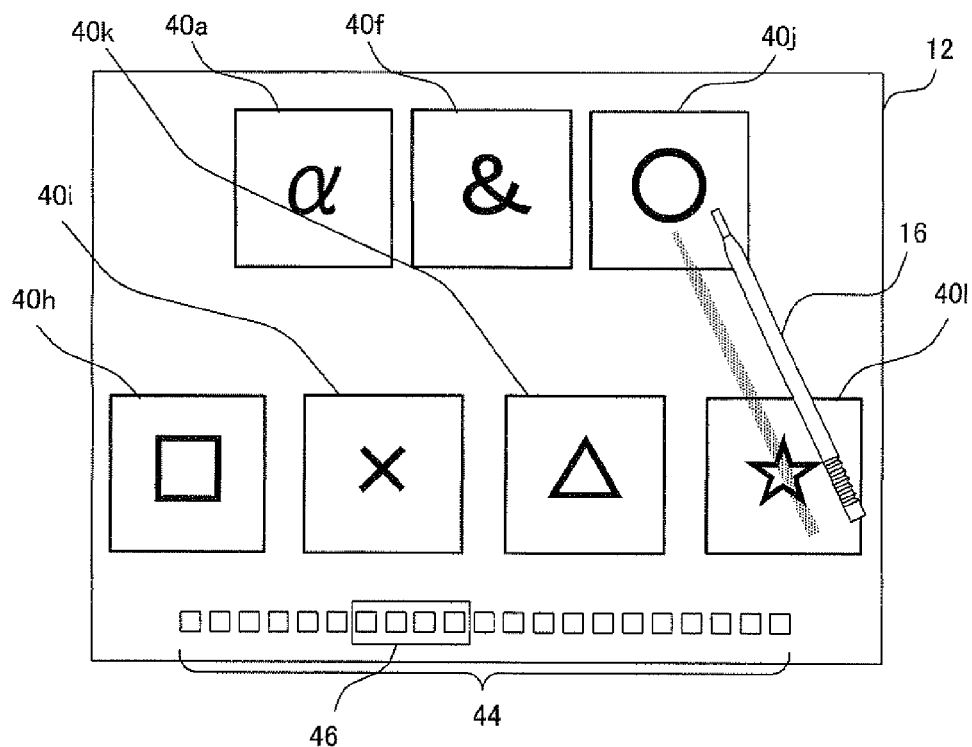
FIG. 27 is a diagram illustrating an image displayed on the screen of the second LCD 12.

Although in the present embodiment the saving area 50 is allowed to save one icon at a time, the present invention is not limited thereto. The saving area 50 may simultaneously save a plurality of icons. For example, FIG. 27 shows an exemplary screen displayed when the icon 40a, the icon 40f, and the icon 40j are sequentially saved in the saving area 50 in order, respectively. When the saving area 50 is allowed to simultaneously save a plurality of icons, the maximum number of the icons which are allowed to be saved in the saving area 50 may be previously set. In this case, when the saving area 50 saves the maximum number of icons (saved icons), a new icon can be saved in the saving area only by returning one of the maximum number of saved icons to the icon line.

Figure 28:
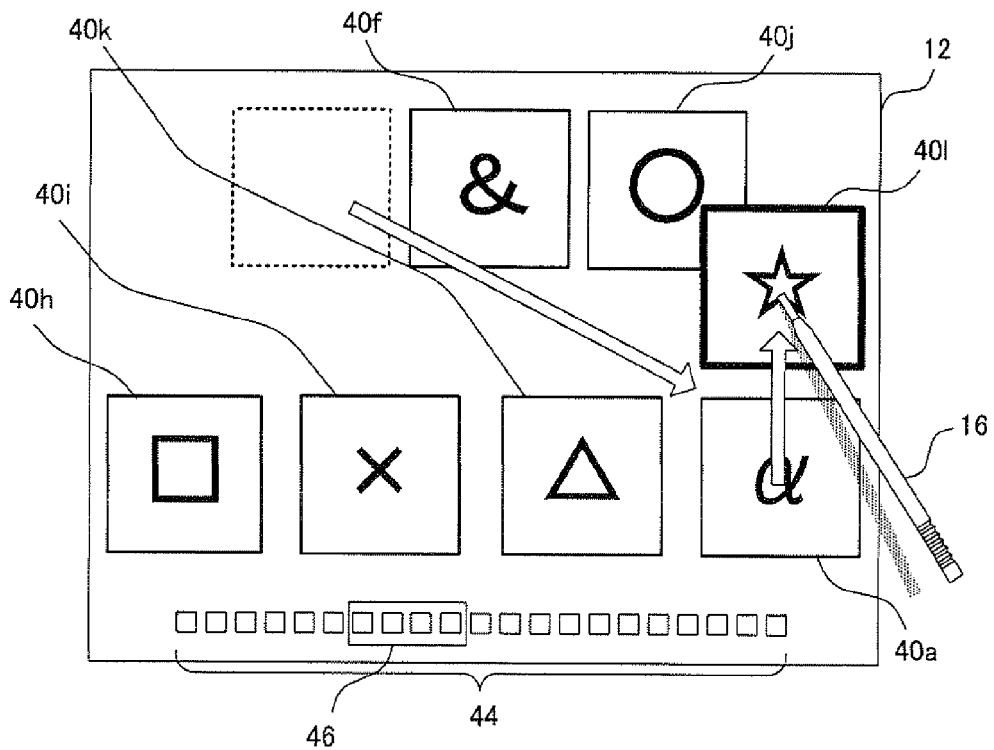
FIG. 28 is a diagram illustrating an image displayed on the screen of the second LCD 12.
Figure 29:
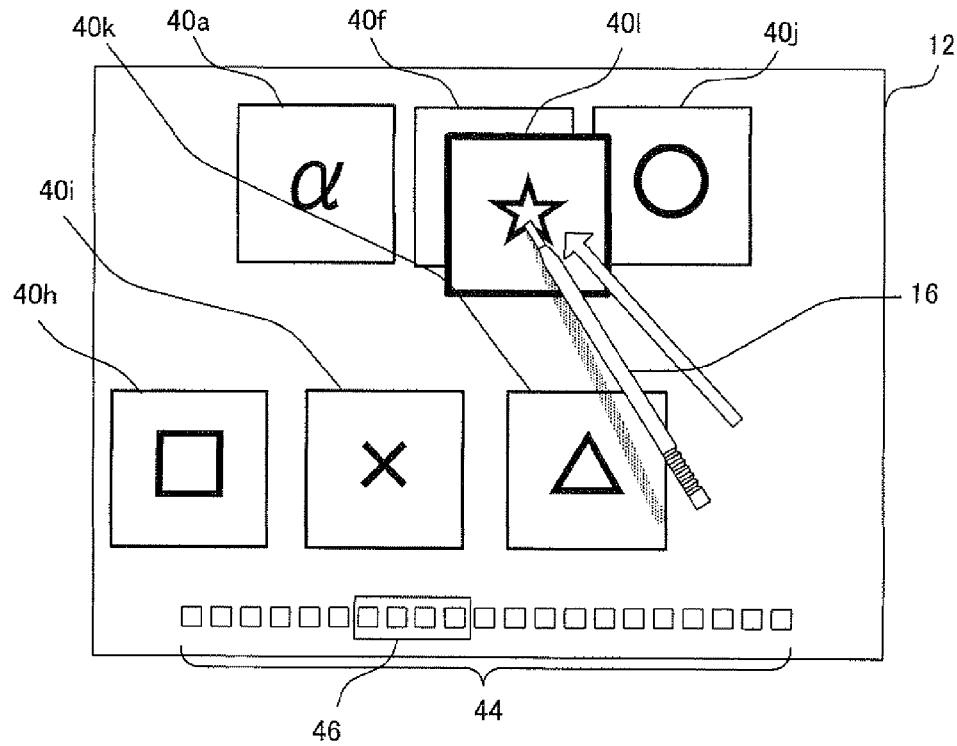
FIG. 29 is a diagram illustrating an image displayed on the screen of the second LCD 12.
Figure 30:
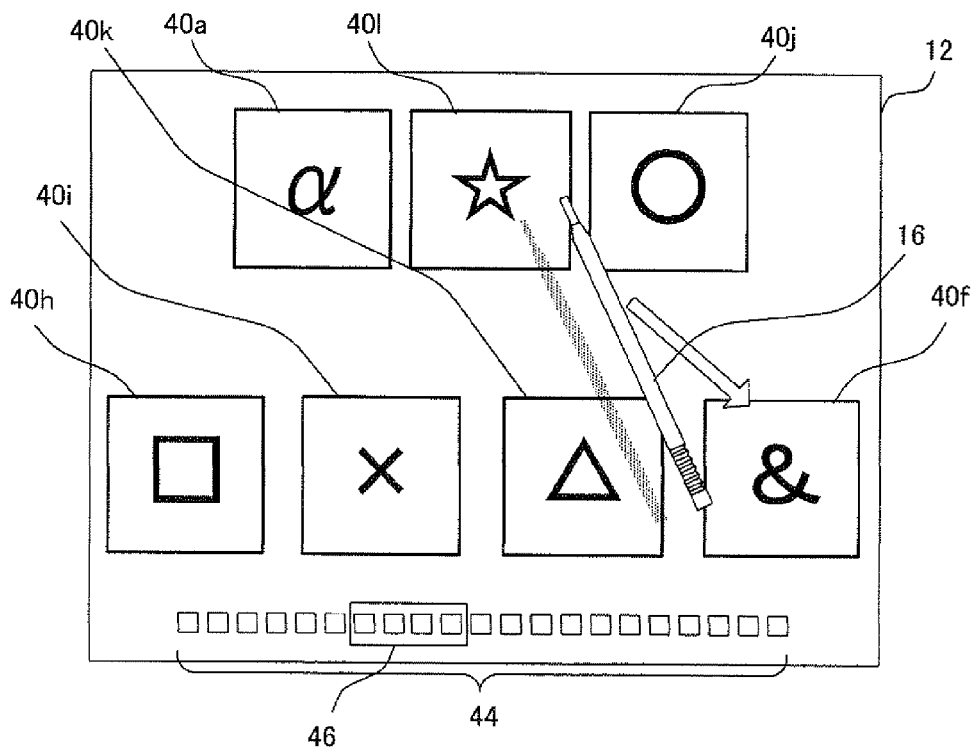
FIG. 30 is a diagram illustrating an image displayed on the screen of the second LCD 12.

Further, also when the saving area 50 is allowed to simultaneously save a plurality of icons as described above, interchange between the icons can be performed as described with reference to FIG. 20. For example, when in the state shown in FIG. 27 a user touches the icon 40l by using the stick 16 so as to slide the stick 16 touching the icon 40l upward on the screen, the icon 40l moves upward so as to follow the stick 16 as shown in FIG. 28, and the icon 40l is extracted from the icon line, and further interchange between the icon 40l and the icon 40a which has been earliest saved in the saving area 50 may be performed such that the icon 40a is inserted in the icon line. Alternatively, in the state shown in FIG. 27, a user touches the icon 40*l* by using the stick 16, and slides the stick 16 touching the icon 40*l* upward on the screen, and thereafter, as shown in FIG. 29, the icon 40*l* is dragged to and dropped onto a desired saved icon (the icon 40*f* in an example shown in FIG. 29) among a plurality of the saved icons saved in the saving area 50. In this case, as shown in FIG. 30, interchange between the icon 40*f* and the icon 40*l* may be performed such that the icon 40*l* is saved in the saving area 50, and the icon 40*f* is inserted in the icon line. Thus, when a user desires that the display order in which a plurality of icons are displayed be changed, the user is allowed to efficiently change the display order.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an object display order changing program for enabling a user to change, by using a switch input unit enabling a direction input, a display order in which a plurality of objects are displayed on a screen,
   the object display order changing program causing a computer to execute instructions comprising:
   displaying a subset (m; m>1) of objects, among the plurality of objects, in an object display area on the screen in a predetermined display order so as to align the subset of objects along a first direction;
   scrolling, in the first direction, the plurality of objects so as to sequentially display each object at a specific position in the object display area, in accordance with an input in the first direction being made by using the switch input unit;
   saving, in a predetermined saving area, an object displayed at the specific position, among the subset of objects displayed in the object display area, when an input in a second direction different from the first direction is made by using the switch input unit;
   scrolling, when an input in the first direction is made by using the switch input unit while an object is saved in the predetermined saving area, all the plurality of objects other than the object saved in the predetermined saving area, across the specific position, in the first direction; and
   inserting, when an input, in the second direction, which is reverse to the input made during the saving in the predetermined saving area, is made by using the switch input unit while an object is saved in the predetermined saving area, the object saved in the predetermined saving area between two objects which are displayed adjacent to each other in the object display area so as to sandwich the specific position.

2. The non-transitory computer-readable storage medium according to claim 1, wherein the switch input unit is a cross key.

3. The non-transitory computer-readable storage medium according to claim 1, wherein the object display order changing program causes the computer to further execute instructions comprising starting a program corresponding to an object displayed at the specific position, among the subset of objects displayed in the object display area, in accordance with a predetermined button operation being performed.

4. The non-transitory computer-readable storage medium according to claim 3, wherein the program is started corresponding to the object displayed at the specific position, among the subset of objects displayed in the object display area, in accordance with the predetermined button operation being performed, only when no object is saved in the predetermined saving area.

5. The non-transitory computer-readable storage medium according to claim 4, wherein the object display order changing program causes the computer to further execute instructions comprising displaying information of the program corresponding to the object displayed at the specific position.

6. The non-transitory computer-readable storage medium according to claim 1, wherein the object display order changing program causes the computer to further execute instructions comprising performing control so as to prevent the input in the second direction made during the saving in the predetermined saving area by using the switch input unit from being accepted while an object is saved in the predetermined saving area.

7. The non-transitory computer-readable storage medium according to claim 1, wherein the object display order changing program causes the computer to further execute instructions comprising performing, in accordance with the predetermined button operation being performed, a process associated with the object displayed at the specific position, and performing control so as to prevent the predetermined button operation from being accepted while an object is saved in the predetermined saving area.

8. An object display order changing apparatus for enabling a user to change, by using a switch input unit enabling a direction input, a display order in which a plurality of objects are displayed on a screen, the object display order changing apparatus comprising:
   a display unit having the screen;
   the switch input unit;
   an object display unit for displaying a subset (m; m>1) of objects, among the plurality of objects, in an object display area on the screen in a predetermined display order so as to align the subset of objects along a first direction;
   a first scrolling unit for scrolling, in the first direction, the plurality of objects so as to sequentially display each object at a specific position in the object display area, in accordance with an input in the first direction being made by using the switch input unit;
   a saving unit for saving, in a predetermined saving area, an object displayed at the specific position, among the subset of objects displayed in the object display area, when an input in a second direction different from the first direction is made by using the switch input unit;
   a second scrolling unit for scrolling, when an input in the first direction is made by using the switch input unit while an object is saved in the predetermined saving area, all the plurality of objects other than the object saved in the predetermined saving area, across the specific position, in the first direction; and
   an object insertion unit for inserting, when an input, in the second direction, which is reverse to the input made for the saving unit, is made by using the switch input unit while an object is saved in the predetermined saving area, the object saved in the predetermined saving area between two objects which are displayed adjacent to each other in the object display area so as to sandwich the specific position.

9. An object display order changing system, comprising:
   a display device having a screen and configured to display image data; and
   an object display order changing apparatus coupled to the display device and for enabling a user to change, by using a switch input unit enabling a direction input, a display order in which a plurality of objects are displayed on the screen, the object display order changing apparatus comprising:

the switch input unit, an object display unit for displaying a subset (m; m>1) of objects, among the plurality of objects, in an object display area on the screen in a predetermined display order so as to align the subset of objects along a first direction, a first scrolling unit for scrolling, in the first direction, the plurality of objects so as to sequentially display each object at a specific position in the object display area, in accordance with an input in the first direction being made by using the switch input unit, a saving unit for saving, in a predetermined saving area, an object displayed at the specific position, among the subset of objects displayed in the object display area, when an input in a second direction different from the first direction is made by using the switch input unit, a second scrolling unit for scrolling, when an input in the first direction is made by using the switch input unit while an object is saved in the predetermined saving area, all the plurality of objects other than the object saved in the predetermined saving area, across the specific position, in the first direction, and an object insertion unit for inserting, when an input, in the second direction, which is reverse to the input made for the saving unit, is made by using the switch input unit while an object is saved in the predetermined saving area, the object saved in the predetermined saving area between two objects which are displayed adjacent to each other in the object display area so as to sandwich the specific position.

10. A method implemented in a computer having one or more processors and for enabling a user to change, by using a switch input unit enabling a direction input, a display order in which a plurality of objects are displayed on a screen, the method comprising:

displaying a subset (m; m>1) of objects, among the plurality of objects, in an object display area on the screen in a predetermined display order so as to align the subset of objects along a first direction;

scrolling, in the first direction, the plurality of objects so as to sequentially display each object at a specific position in the object display area, in accordance with an input in the first direction being made by using the switch input unit;

saving, in a predetermined saving area, an object displayed at the specific position, among the subset of objects displayed in the object display area, when an input in a second direction different from the first direction is made by using the switch input unit;

scrolling, when an input in the first direction is made by using the switch input unit while an object is saved in the predetermined saving area, all the plurality of objects other than the object saved in the predetermined saving area, across the specific position, in the first direction; and inserting, via the one or more processors, when an input, in the second direction, which is reverse to the input made during the saving in the predetermined saving area, is made by using the switch input unit while an object is saved in the predetermined saving area, the object saved in the predetermined saving area between two objects which are displayed adjacent to each other in the object display area so as to sandwich the specific position.

* * * * *